United States Patent [19]
Kurashima

[11] Patent Number: 6,029,191
[45] Date of Patent: Feb. 22, 2000

[54] APPLICATION SHARING SYSTEM WHICH CAN DYNAMICALLY CHANGE AN OPERATING CONDITION OF AN APPLICATION PROGRAM OF EACH TERMINAL FROM A SOLE-MODE TO A SHARE-MODE AND VICE VERSA

[75] Inventor: Akihisa Kurashima, Tokyo, Japan

[73] Assignee: NEC Corporation, Tokyo, Japan

[21] Appl. No.: 09/050,465

[22] Filed: Mar. 31, 1998

[30] Foreign Application Priority Data

Mar. 31, 1997 [JP] Japan .................................. 9-096542

[51] Int. Cl.[7] ...................................................... G06F 15/16
[52] U.S. Cl. .......................................... 709/205; 709/204
[58] Field of Search .................................... 709/204, 205, 709/106, 213, 214, 201; 379/202, 205; 370/260; 345/330, 331, 332, 335

[56] References Cited

U.S. PATENT DOCUMENTS

| | | | |
|---|---|---|---|
| 5,557,725 | 9/1996 | Ansberry et al. | 395/153 |
| 5,577,188 | 11/1996 | Zhu | 395/326 |
| 5,649,105 | 7/1997 | Aldred et al. | 709/204 |
| 5,748,894 | 5/1998 | Ishizaki et al. | 709/204 |
| 5,764,904 | 6/1998 | Kurashima | 395/200.38 |
| 5,799,191 | 8/1998 | Moriyasu et al. | 395/682 |
| 5,805,846 | 9/1998 | Nakajima et al. | 395/330 |
| 5,864,711 | 1/1999 | Mairs et al. | 709/204 |
| 5,872,924 | 2/1999 | Nakayama et al. | 709/205 |
| 5,874,960 | 2/1999 | Mairs et al. | 345/340 |
| 5,933,597 | 8/1999 | Hogan | 709/204 |

FOREIGN PATENT DOCUMENTS 6-83785  3/1994  Japan .

*Primary Examiner*—Mehmet B. Geckil
*Attorney, Agent, or Firm*—Foley & Lardner

[57] ABSTRACT

In an application sharing system wherein terminals having application programs of the same sort are interconnected via communication channels, the application program (AP) of each of the terminals includes a primary processing part (A), a message transfer part (C), a mode registration part (F), and a share-mode transition control part (J) supplied with a share-mode transition request with channel information for setting a share mode and the channel information in the mode registration part and for making the message transfer part communicate with the application program of a sharing partner of the terminals by the use of a specified channel specified by the channel information to perform a matching operation of matching internal states of the primary processing parts of the application programs of the terminal in question and of the sharing partner. When the share mode is set in the mode registration part, the message transfer part transfers a user message from a user input processing part (B) of the primary processing part to a message processing part (C) of the primary processing part and to the sharing partner by the use of the specified channel and transfers to the message processing part another user message transferred from the application program of the sharing partner by the use of the specified channel.

10 Claims, 19 Drawing Sheets

FIF.6

| APPLICATION NAME | COMMUNICATION CHANNEL ID | OPERATING TERMINAL |
| --- | --- | --- |
| PAINTING | 1 | 1, 2, 3 |
| CHAT | 2 | 1, 2, 3 |
| PAINTING | 3 | 2, 3 |
| PAINTING | 4 | 1, 3 |
| PRESENTATION | 5 | 1, 2, 3 |
| GAME | 6 | 1, 2, 3 |
| CHAT | 7 | 2, 3 |
| ⋮ | ⋮ | ⋮ |

APPLICATION SHARING SYSTEM WHICH CAN DYNAMICALLY CHANGE AN OPERATING CONDITION OF AN APPLICATION PROGRAM OF EACH TERMINAL FROM A SOLE-MODE TO A SHARE-MODE AND VICE VERSA

BACKGROUND OF THE INVENTION

This invention relates to an application sharing system which enables sharing of application processing by a plurality of terminal users.

By the use of a plurality of terminals connected via a network, a plurality of terminal users can participate in a joint work such as a conference. In this event, information must be shared among the users. As one of such information sharing, sharing of application processing is known. Herein, sharing of application processing is to make a result of the application processing executed in each user's terminal be reflected at other user's terminals in real time and may simply be called application sharing.

The application sharing is classified into a centralized execution system and a decentralized or distributed processing system. In the centralized execution system, an application program runs on a particular one of the terminals which collects all inputs supplied through the respective terminals, executes the application processing, and delivers the result of processing to the respective terminals. On the other hand, in the distributed processing system, application programs of the same sort run on the respective terminals each of which collects all inputs supplied through the respective terminals, and executes the application processing. Thus, the centralized execution system requires the result of processing to be sent back to the respective terminals. This brings about an increase in communication traffic. In order to suppress the increase in communication traffic, it is preferred to use the distributed processing system with less traffic. For example, a conventional application sharing system using the distributed processing system is disclosed in Japanese Unexamined Patent Publication (JP-A) No. 6-83785 (83785/1994).

However, the conventional application sharing system using the distributed processing system is basically operated in a manner such that the application programs of the same sort are simultaneously started in the respective terminals and mutually communicate with one another to realize the application sharing. No special consideration is made about any possible change in operating condition of the application programs. It is therefore difficult to flexibly adapt to dynamic changes in working environment and to smoothly proceed with a work, as will hereinafter be described.

For example, in a certain working environment, a single user solely performs the work by the use of the application program and, at a particular time instant, another user desires to participate to jointly proceed with the work. In such circumstances, it is impossible in the conventional application sharing system to shift the application program being solely operated into a shared condition. Thus, it is impossible to change a sole work into a joint work.

On the contrary, it is assumed that a plurality of users jointly perform the work and, after a particular time instant, one of the users solely continues the work. In this event, it is impossible in the conventional application sharing system to shift the shared condition of the application program into a sole operation condition. Thus, it is impossible to change the joint work into the sole work.

SUMMARY OF THE INVENTION

It is therefore an object of this invention to provide an application sharing system capable of dynamically changing an operating condition of an application program to flexibly adapt to any change in a working environment where the application program is used.

Other objects of this invention will become clear as the description proceeds.

According to a first aspect of this invention, there is provided an application sharing system in which a plurality of terminals having application programs of the same sort are interconnected via a network having a plurality of communication channels so that the terminals are communicable with each other, wherein the application program of each of the terminals comprises:

a primary processing part comprising a user input processing part for producing, in response to a user input supplied to the application program of the each of the terminals, a user message representative of a content of the user input and a message processing part for carrying out, in response to an incoming message, an operation based on the incoming message;

a mode registration part for holding whether an operation mode of the application program of the each of the terminals is a sole mode or a share mode and for holding, when the operation mode of the application program of the each of the terminals is the share mode, channel information specifying one of the communication channels as a specified channel;

message transfer means for carrying out, when the sole mode is set in the mode registration part, a transferring operation of transferring the user message to the message processing part as the incoming message, the message transfer means carrying out, when the share mode is set in the mode registration part, the transferring operation of transferring the use message to the message processing part as the incoming message, another transferring operation of transferring the user message to the application program of a sharing partner of the terminals by the use of the specified channel, and still another transferring operation of transferring to the message processing part as the incoming message another user message transferred from the application program of the sharing partner by the use of the specified channel; and start condition control means supplied with a share-mode start request with the channel information for setting the share mode and the channel information in the mode registration part and for making the message transfer part communicate with the application program of the sharing partner by the use of the specified channel to perform a matching operation of matching internal states of the primary processing parts of the application programs of the each of the terminals and of the sharing partner.

According to a second aspect of this invention, there is provided an application sharing system in which a plurality of terminals having application programs of the same sort are interconnected via a network having a plurality of communication channels so that the terminals are communicable with each other, wherein the application program of each of the terminals comprises:

a primary processing part comprising a user input processing part for producing, in response to a user input supplied to the application program of the each of the terminals, a user message representative of a content of the user input and a message processing part for carrying out, in response to an incoming message, an operation based on the incoming message;

a mode registration part for holding whether an operation mode of the application program of the each of the terminals is a sole mode or a share mode and for holding, when the operation mode of the application program of the each of the terminals is the share mode, channel information specifying one of the communication channels as a specified channel;

message transfer means for carrying out, when the sole mode is set in the mode registration part, a transferring operation of transferring the user message to the message processing part as the incoming message, the message transfer means carrying out, when the share mode is set in the mode registration part, the transferring operation of transferring the user message to the message processing part as the incoming message, another transferring operation of transferring the user message to the application program of a sharing partner of the terminals by the use of the specified channel, and still another transferring operation of transferring to the message processing part as the incoming message another user message transferred from the application program of the sharing partner by the use of the specified channel; and share-mode transition control means supplied with a share-mode transition request with the channel information with the sole mode set in the mode registration part for setting, instead of the sole mode, the share mode and the channel information in the mode registration part and for making the message transfer part communicate with the application program of the sharing partner by the use of the specified channel to perform a matching operation of matching internal states of the primary processing parts of the application programs of the each of the terminals and of the sharing partner.

According to a third aspect of this invention, there is provided an application sharing system in which a plurality of terminals having application programs of the same sort are interconnected via a network having a plurality of communication channels so that the terminals are communicable with each other, wherein the application program of each of the terminals comprises:

a primary processing part comprising a user input processing part for producing, in response to a user input supplied to the application program of the each of the terminals, a user message representative of a content of the user input and a message processing part for carrying out, in response to an incoming message, an operation based on the incoming message;

a mode registration part for holding whether an operation mode of the application program of the each of the terminals is a sole mode or a share mode and for holding, when the operation mode of the application program of the each of the terminals is the share mode, channel information specifying one of the communication channels as a specified channel;

message transfer means for carrying out, when the sole mode is set in the mode registration part, a transferring operation of transferring the user message to the message processing part as the incoming message, the message transfer means carrying out, when the share mode is set in the mode registration part, the transferring operation of transferring the user message to the message processing part as the incoming message, another transferring operation of transferring the user message to the application program of a sharing partner of the terminals by the use of the specified channel, and still another transferring operation of transferring to the message processing part as the incoming message another user message transferred from the application program of the sharing partner by the use of the specified channel; and sole-mode transition control means supplied with a sole-mode transition request with the share mode set in the mode registration part for setting, instead of the share mode and the channel information, the sole mode in the mode registration part and for making the message transfer part inhibit communication by the use of the specified channel.

According to a fourth aspect of the invention, there is provided a machine-readable recording medium for recording an application program to be executed for application sharing in an application sharing system in which a plurality of terminals are interconnected via a network having a plurality of communication channels so that the terminals are communicable with each other, wherein the application program serves to make each of the terminals act as:

a primary processing part comprising a user input processing part for producing, in response to a user input supplied to the application program of the each of the terminals, a user message representative of a content of the user input and a message processing part for carrying out, in response to an incoming message, an operation based on the incoming message;

a mode registration part for holding whether an operation mode of the application program of the each of the terminals is a sole mode or a share mode and for holding, when the operation mode of the application program of the each of the terminals is the share mode, channel information specifying one of the communication channels as a specified channel;

message transfer means for carrying out, when the sole mode is set in the mode registration part, a transferring operation of transferring the user message to the message processing part as the incoming message, the message transfer means carrying out, when the share mode is set in the mode registration part, the transferring operation of transferring the user message to the message processing part as the incoming message, another transferring operation of transferring the user message to the application program of a sharing partner of the terminals by the use of the specified channel, and still another transferring operation of transferring to the message processing part as the incoming message another user message transferred from the application program of the sharing partner by the use of the specified channel; and start condition control means supplied with a share-mode start request with the channel information for setting the share mode and the channel information in the mode registration part and for making the message transfer part communicate with the application program of the sharing partner by the use of the specified channel to perform a matching operation of matching internal states of the primary processing parts of the application programs of the each of the terminals and of the sharing partner.

BRIEF DESCRIPTION OF THE DRAWING

FIG. 9 shows an application program managing table illustrated in FIG. 8;

DESCRIPTION OF THE PREFERRED EMBODIMENT

Figure 1:
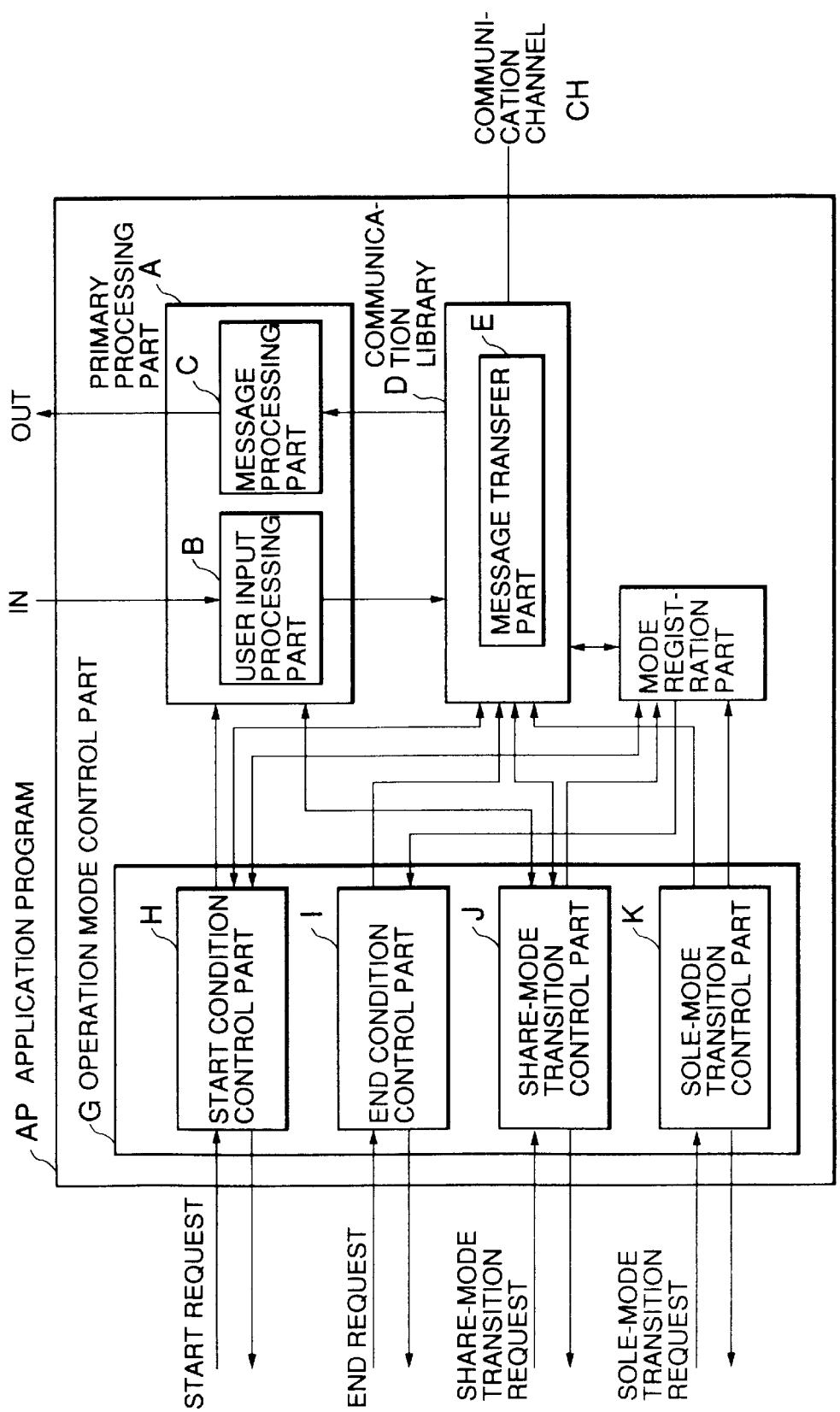
FIG. 1 is a block diagram of an application program used in an application sharing system according to this invention.

According to this invention, there is provided an application sharing system in which a plurality of terminals having application programs of the same sort are interconnected via a network containing a plurality of communication channels so that the terminals are communicable with one another, wherein each of the application programs comprises:

a primary processing part including a user input processing part responsive to a user input supplied to the application program for producing a message representative of a content of the user input and a message processing part responsive to the message for carrying out an operation corresponding thereto;

a mode registration part for holding whether an operation mode of the application program is a sole mode or a share mode and, if it is the share mode, holding information of a communication channel to be used for communication with another application program in another terminal as a partner application program;

a message transfer part for carrying out first and second transfer operations when the sole mode and the share mode are set in the mode register, respectively, the first transfer operation being such that the message supplied from the user input processing part is transferred to the message processing part, the second transfer operation being such that the message is transferred to the message processing part and to the partner application program by the use of the communication channel and that a partner message having been transferred from the partner application program via the communication channel is transferred to the message processing part;

a start condition control part responsive to a share-mode start request with a designation of the communication channel for setting the share mode and the information of the communication channel in the mode registration part and communicating with the partner application program by the use of the communication channel to perform a matching operation of matching internal states of the application program and the partner application program; and a share-mode transition control part supplied with a share-mode transition request with a designation of the communication channel during the sole mode set in the mode registration part for setting the share mode and the information of the designated communication channel in the mode registration part and communicating with the partner application program by the use of the designated communication channel to perform the matching operation of matching the internal states of the application program and the partner application program.

It is noted here that the internal state of the application program corresponds to a running environment of the primary processing part. For example, in case where the application program in consideration is a painting software tool, the primary processing art carries a function of the painting software tool. The internal state then includes all information of a picture currently painted by the primary processing part as well as all other information such as a position of a cursor and a state of selection of an icon on a display screen. Generally speaking, the internal state will be explained as follows. Let a particular application program α be interrupted at a particular time instant t to pick up state information representative of a state at that time. The state information is transplanted into another application program β of the same sort. Then, the application program β becomes substantially identical with the application program α at the particular time instant t. Thereafter, when the application program β is started and the application program α is restarted, their operations will be identical. The state information picked up as described above is the internal state of the program.

The above-mentioned matching operation is carried out in two different manners in dependence upon situations. Specifically, in case where one application program is being operated in the sole mode on one terminal and thereafter the other application program is started on the other terminal in the share mode, the internal state of the other application program is matched to that of the one application program already operated in the sole mode. On the other hand, in case where a plurality of application programs being individually operated in the sole mode are shifted into the share mode, the internal state of any one of the application programs is selected as a goal of matching to which the internal states of the remaining application programs are matched. As will readily be understood, it is possible to perform the matching operation in accordance with any other predetermined rule.

In the application sharing system of the above-mentioned structure, the message transfer part of the application program, for which the sole mode is set in the mode register, transfers the message supplied from the user input processing part simply to the message processing part of the application program. Therefore, the application program is solely operated independent of any other application program of the same sort. Thus, it is possible to carry out a sole work by the use of the application program.

On the other hand, if the share mode is set in the mode register, the message transfer part of the application program transfers the message supplied from the user input processing part both to the message processing part of the application program and to the partner application program by the use of the communication channel. A similar message transfer part of the partner application program transfers the message to the message processing part of the partner application program. Therefore, application sharing is carried out on those terminals where the application programs of the same sort are operated.

In response to the share-mode start request with the designation of the communication channel, the start condition control part of each application program sets the share mode and the information of the communication channel in the mode registration part and communicates with the partner application program by the use of the communication channel to perform the matching operation of matching the internal states of the application program and the partner application program. Supplied with the share-mode transition request during the sole mode set in the mode register, the share-mode transition control part sets the share mode and the information of the communication channel in the mode registration part and communicates with the partner application program by the use of the communication channel to perform the matching operation of matching the internal states of the application program and the partner application program. Thus, it is possible to shift the sole work into a joint work.

For example, a first application program is operated in the sole mode on a first terminal A to perform the sole work. It is assumed here that the first application program on the first terminal A receives the share-mode transition request with the designation of a particular communication channel. On the other hand, each of second and third terminals B and C having second and third application programs of the same sort as the first application program is supplied with the share-mode start request with the designation of the same communication channel. In this event, the share-mode transition control part of the first application program on the first terminal A sets the share mode and the information of the communication channel in the mode registration part of the first application program which is then put into the share mode. Likewise, the start operation control parts of the second and the third application programs on the second and the third terminals B and C set the share mode and the information of the communication channel in the mode registers of the second and the third application programs which are then put into the share mode. In addition, communication is carried out among the first, the second, and the third application programs to match the internal states of the second and the third application programs on the second and the third terminals B and C to that of the first application program on the first terminal A. In this manner, those data produced by the first application program on the first terminal A can be shared among the first, the second, and the third terminals A, B, and C to proceed with the joint work.

On the other hand, consideration will be made about the case where each of the first and the second terminals A and B is performing the sole work by individually operating the first and the second application programs of the same sort in the sole mode. It is assumed here that the share-mode transition requests are supplied to the first and the second application programs on the first and the second terminals A and B, respectively, with the designation of the same communication channel. In this event, the share-mode transition control parts of the first and the second application programs on the first and the second terminals A and B set the share mode and the channel information in the mode registers of the first and the second application programs, respectively, which are then put into the share mode. In addition, the internal states of the first and the second application programs are matched to each other. For example, if the internal state of the second application program is matched to that of the first application program on the first terminal A, the data prepared by the first application program on the first terminal A is shared between the first and the second terminals A and B to proceed with the joint work. On the other hand, if the internal state of the first application program is matched to that of the second application program on the second terminal B, the data prepared by the second application program on the second terminal B is shared between the first and the second terminals A and B to proceed with the joint work.

According to this invention, there is also provided an application sharing system in which a plurality of terminals having application programs of the same sort are interconnected via a network containing a plurality of communication channels so that the terminals are communicable with one another, wherein each of the application programs comprises:

a primary processing part including a user input processing part responsive to a user input supplied to the application program for producing a message representative of a content of the user input and a message processing part responsive to the message for carrying out an operation corresponding thereto;

a mode registration part for holding whether an operation mode of the application program is a sole mode or a share mode and, if it is the share mode, holding information of a communication channel to be used for communication with another application program in another terminal as a partner application program;

a message transfer part for carrying out first and second transfer operations when the sole mode and the share mode are set in the mode register, respectively, the first transfer operation being such that the message supplied from the user input processing part is transferred to the message processing part, the second transfer operation being such that the message is transferred to the message processing part and to the partner application program by the use of the communication channel and that a partner message having been transferred from the partner application program via the communication channel is transferred to the message processing part; and a share-mode transition control part which is on one hand supplied with a share-mode transition request with a designation of the communication channel during the sole mode set in the mode registration part for setting the share mode and the information of the designated communication channel in the mode registration part and communicating with the partner application program by the use of the designated communication channel to perform the matching operation of matching the internal states of the application program and the partner application program, and which is on the other hand responsive to communication from another application program as a new partner application program via the communication channel during the share mode set in the mode registration part for matching the internal states of the application program, the partner application program, and the new partner application program.

For example, the above-mentioned matching operation is such that the internal state of any one of the application programs is selected as a goal of matching to which the internal states of the remaining application programs are matched. As will readily be understood, it is possible to perform the matching operation in accordance with any other predetermined rule.

The application sharing system of the above-mentioned structure is operable like the first-mentioned one. Specifically, it is possible to perform the sole work using the application program for which the sole mode is set in the mode register. In addition, it is possible to perform the joint work via the application sharing by the application programs for which the share mode is set in the mode registers.

Supplied with the share-mode transition request during the sole mode set in the mode register, the share-mode transition control part of each application program sets the share mode and the information of the communication channel in the mode registration part and communicates with another application program as the partner application program by the use of the designated communication channel to perform the matching operation of matching the internal states of the application program and the partner application program. On the other hand, when the communication is received from another application program as the new partner application program by the use of the communication channel during the share mode set in the mode register, the matching operation is carried out to match the internal states of the application program, the partner application program, and the new partner application program. Thus, it is possible to shift the sole work into the joint work.

For example, the first application program is operated on the first terminal A in the sole mode to perform the sole work. On the other hand, the second and the third application programs of the same sort as the first application program are operated on the second and the third terminals B and C in the share mode to perform the joint work. It is assumed here that the first application program of the first terminal A is supplied with the share-mode transition request with the designation of the communication channel used by the second and the third terminals B and C. In this event, the share-mode transition control part of the first application program on the first terminal A sets the share mode and the information of the communication channel in the mode registration part of the first application program which is then put into the share mode, and communicates with the second and the third application programs of the second and the third terminals B and C as the partner application programs to match the internal states of the first, the second, and the third application programs of the first, the second, and the third terminals A, B, and C with one another. For example, if the internal states of the second and the third application programs of the second and the third terminals B and C are matched to that of the first application program of the first terminal A, the data prepared by the first application program on the first terminal A is shared among the first, the second, and the third terminals A, B and C to continuously proceed with the joint work. If the internal state of the first application program of the first terminal A is matched to those of the second and the third application programs of the second and the third terminals B and C, the data prepared by the second and the third application programs on the second and the third terminals B and C are shared among the first, the second, and the third terminals A, B, and C to continuously proceed with the joint work.

According to this invention, there is also provided an application sharing system in which a plurality of terminals having application programs of the same sort are interconnected via a network containing a plurality of communication channels so that the terminals are communicable with one another, wherein each of the application programs comprises:

a primary processing part including a user input processing part responsive to a user input supplied to the application program for producing a message representative of a content of the user input and a message processing part responsive to the message for carrying out an operation corresponding thereto;

a mode registration part for holding whether an operation mode of the application program is a sole mode or a share mode and, if it is the share mode, holding information of a communication channel to be used for communication with another application program in another terminal as a partner application program;

a message transfer part for carrying out first and second transfer operations when the sole mode and the share mode are set in the mode register, respectively, the first transfer operation being such that the message supplied from the user input processing part is transferred to the message processing part, the second transfer operation being such that the message is transferred to the message processing part and to the partner application program by the use of the communication channel and that a partner message having been transferred from the partner application program via the communication channel is transferred to the message processing part; and a sole-mode transition control part supplied with a sole-mode transition request during the share mode set in the mode registration part for interrupting the connection by the communication channel set in the mode registration part and setting the sole mode in the mode register.

The application sharing system of the above-mentioned structure is operable like the first-mentioned one. Specifically, it is possible to carry out the sole work using the application program for which the sole mode is set in the mode registration part and to perform the joint work via the application sharing by the application programs for which the share mode is set in the mode registers.

Supplied with the sole-mode transition request during the share mode set in the mode register, the sole-mode transition control part of each application program interrupts the connection via the communication channel set in the mode registration part and sets the sole mode in the mode register. Thus, the share mode is shifted into the sole mode with the internal state maintained as it is. It is therefore possible to shift the joint work into the sole work.

For example, consideration is made about the case where the first, the second, and the third application programs of the same sort are operated on the first, the second, and the third terminals A, B, and C in the share mode, respectively, to perform the joint work. It is assumed here that the sole-mode transition request is given to the first application program on the first terminal A. In this event, the sole-mode transition control part of the first application program interrupts the connection via the communication channel and sets the sole mode in the mode registration part to put the first application program into the sole mode. Therefore, the data prepared through the joint work by the first, the second, and the third terminals A, B, and C can be continuously used by the first application program of the first terminal A. On the other hand, the second and the third terminals B and C can continuously proceed with the joint work.

Now, description will be made in detail as regards this invention with reference to the drawing.

Referring to FIG. 1, an application program AP for use in an application sharing system according to this invention comprises a primary processing part A, a communication library D, a mode registration part F, and an operation mode control part G.

The primary processing part A deals with overall application processing of the application program AP. For example, if the application program AP is a painting software tool, the primary processing part A deals with overall processing required in the painting software tool. Likewise, if the application program AP is a chat software tool, the primary processing part A deals with overall processing required in the chat software tool.

The primary processing part A comprises a user input processing part B and a message processing part C. The user input processing part B is responsive to a user input IN supplied from a user to the application program AP through a mouse and a keyboard. The message processing part C is for processing the user input IN to produce a processing result OUT which is presented to the user via a CRT or the like. In case of an ordinary application program, the user input IN received by the user input processing part B is simply transmitted to the message processing part C to be processed. On the other hand, in the application sharing system of a distributed processing system, the user input IN supplied to any one of application programs involved in application sharing must be processed by all of the application programs. To this end, the user input processing part B converts the user input IN supplied thereto into a message which is then delivered to the communication library D. The message processing part C processes the user input IN as the message supplied from the communication library D.

The mode registration part F holds one of a sole mode and a share mode as an operation mode of the application program AP and, if it is the share mode, holds an ID of a communication channel to be used for communication with another application program of the same sort on another terminal as a partner application program involved in the application sharing.

The communication library D provides the application program AP with a function of communicating with other application programs. The communication library D comprises a message transfer part E for transferring the message corresponding to the user input IN.

When the sole mode is set in the mode registration part F, the message transfer part E transfers the message supplied from the user input processing part B to the message processing part C alone. On the other hand, when the share mode is set in the mode registration part F, the message supplied from the user input processing part B is transferred both to the message processing part C and to the partner application program on another terminal by the use of a communication channel CH. Furthermore, in the share mode, a partner message having been transferred from the partner application program via the communication channel CH is transferred to the message processing part C. The communication channel CH used in the share mode is specified by the ID set in the mode registration part F.

The operation mode control part G is for controlling an operating condition of the application program AP. In this embodiment, the operation mode control part G comprises a start condition control part H, an end condition control part I, a share-mode transition control part J, and a sole-mode transition control part K.

The start condition control part H is responsive to a start request and starts the application program AP in the sole mode or the share mode.

Figure 2:
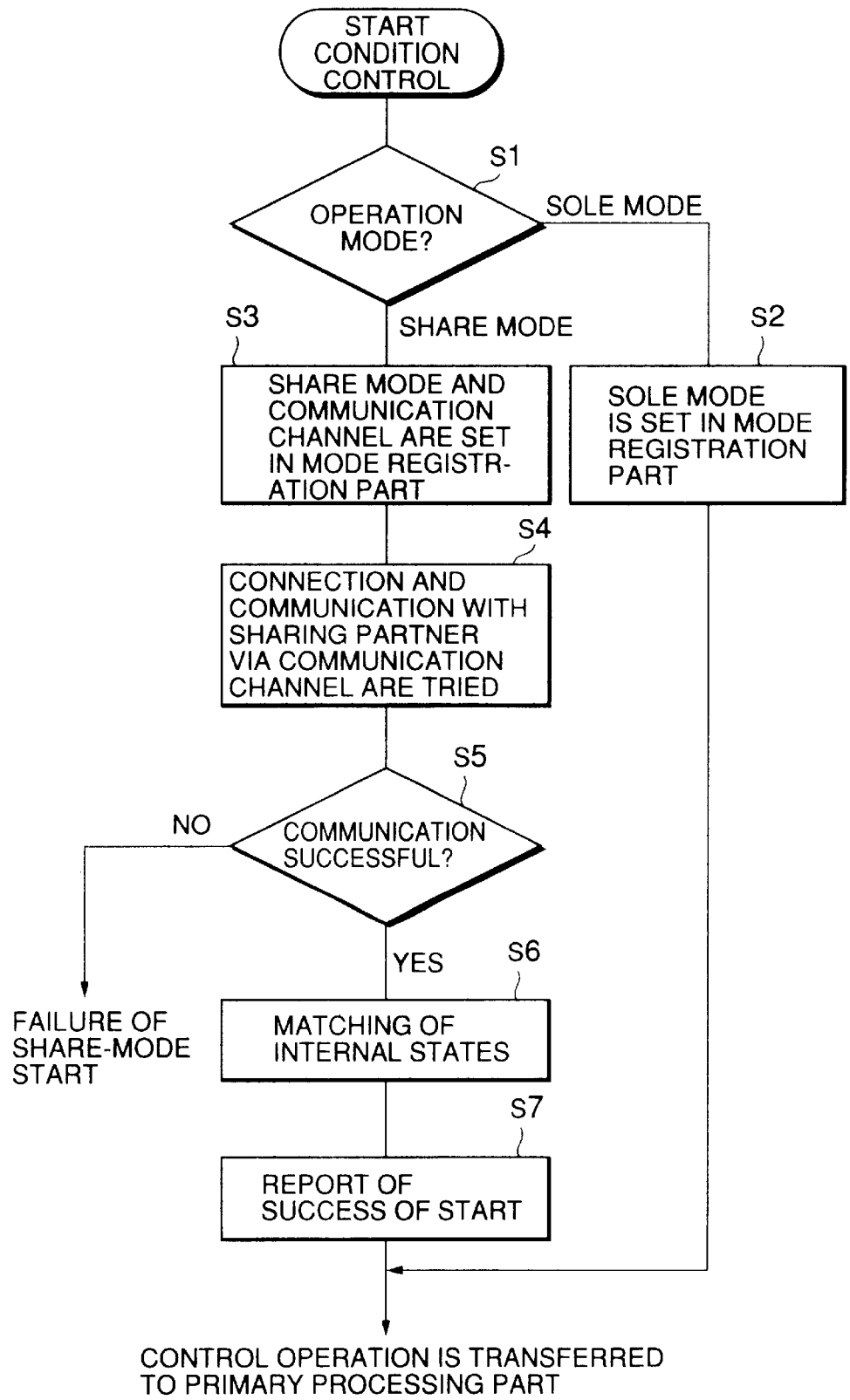
FIG. 2 is a flow chart for describing an operation of a start condition control part illustrated in FIG. 1.

Referring to FIG. 2, the operation of the start condition control part H will hereinafter be described.

When the start request for the application program AP is produced, the start condition control part H judges whether the operation mode designated by the start request is the sole mode or the share mode (step S1). If it is the sole mode, the sole mode is set in the mode registration part F (step S2). Then, control operation is transferred to the primary processing part A. If the share mode is designated, the share mode and the ID of the communication channel designated by the start request are set in the mode registration part F (step S3). By the use of the communication library D, trial is made of connection and communication with the sharing partner via the communication channel (step S4). If the communication is unsuccessful (NO in step S5), the application sharing is impossible and a share-mode start is failed. If the communication is successful (YES in step S5), a matching operation is carried out to match internal states of the application program and the partner application program (step S6). The success of the share-mode start is reported as a response (step S7). Then, the control operation is transferred to the primary processing part A.

The end condition control part I is responsive to an end request for ending the operation of the application program AP.

Figure 3:
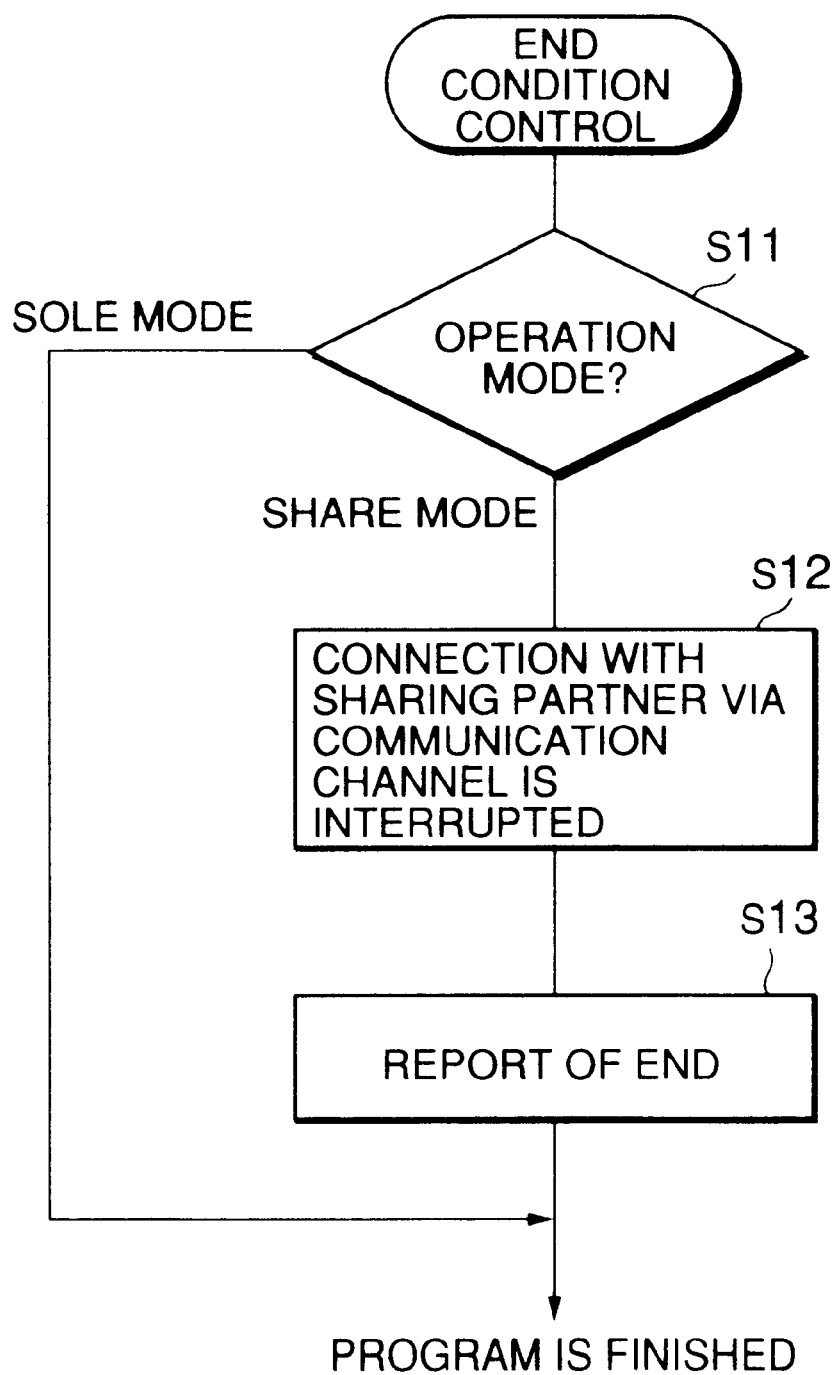
FIG. 3 is a flow chart for describing an operation of an end condition control part illustrated in FIG. 1.

Referring to FIG. 3, the operation of the end condition control part I will be described.

When the end request for the application program AP is produced, the end condition control part I identifies the operation mode with reference to the mode registration part F (step S11). In case of the sole mode, the application program AP is directly finished. In case of the share mode, the end condition control part I makes the communication library D interrupt the connection via the communication channel (step S12). Then, the end of the share mode is reported as a response (step S13) and the application program AP is finished.

The share-mode transition control part J is responsive to a share-mode transition request and switches the operation mode of the application program AP from the sole mode into the share mode.

Figure 4:
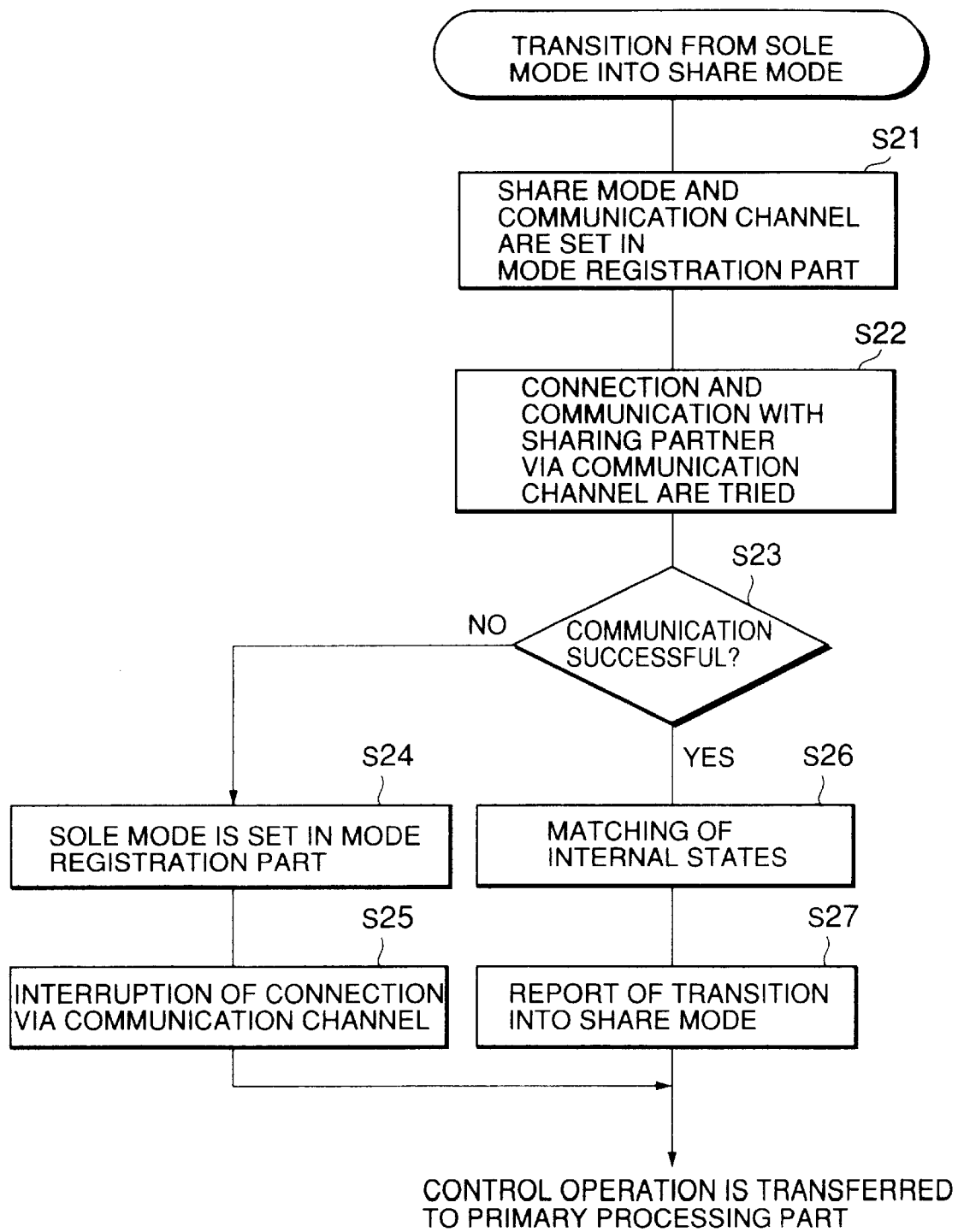
FIG. 4 is a flow chart for describing an operation of a share-mode transition control part illustrated in FIG. 1.

Referring to FIG. 4, the operation of the share mode transition control part J will be described.

When the share-mode transition request for the application program AP is produced, the share-mode transition control part J accepts the request only when the sole mode is set in the mode registration part F. At first, the share-mode transition control part J sets the share mode in the mode registration part F instead of the sole mode and further sets the ID of the communication channel designated by the request in the mode registration part F (step S21). Next, by the use of the communication library D, trial is made of connection and communication with the sharing partner via the communication channel (step S22). If the communication is unsuccessful (NO in step S23), the application sharing is impossible so that the sole mode is set in the mode registration part F (step S24). The connection by the communication channel CH in the communication library D is interrupted (step S25). The control operation is transferred to the primary processing part A to continue the operation in the sole mode. When the communication is successful, the matching operation is carried out to match the internal states of the application program and the partner application program (step S26). The transition to the share mode is reported as a response (step S27). Then, the control operation is transferred to the primary processing part A.

Although not illustrated in FIG. 4, the share-mode transition control part J carries out the following operation. Specifically, it is assumed that, when the share mode is set in the mode registration part F, i.e., when the application program AP is operated in the share mode, communication is received via the communication channel CH from another application program as a new partner application program. In this event, the matching operation is carried out to match the internal states of the application program, the partner application program, and the new partner application program.

The sole-mode transition control part K is responsive to a sole mode transition request and switches the operation mode of the application program AP from the share mode into the sole mode.

Figure 5:
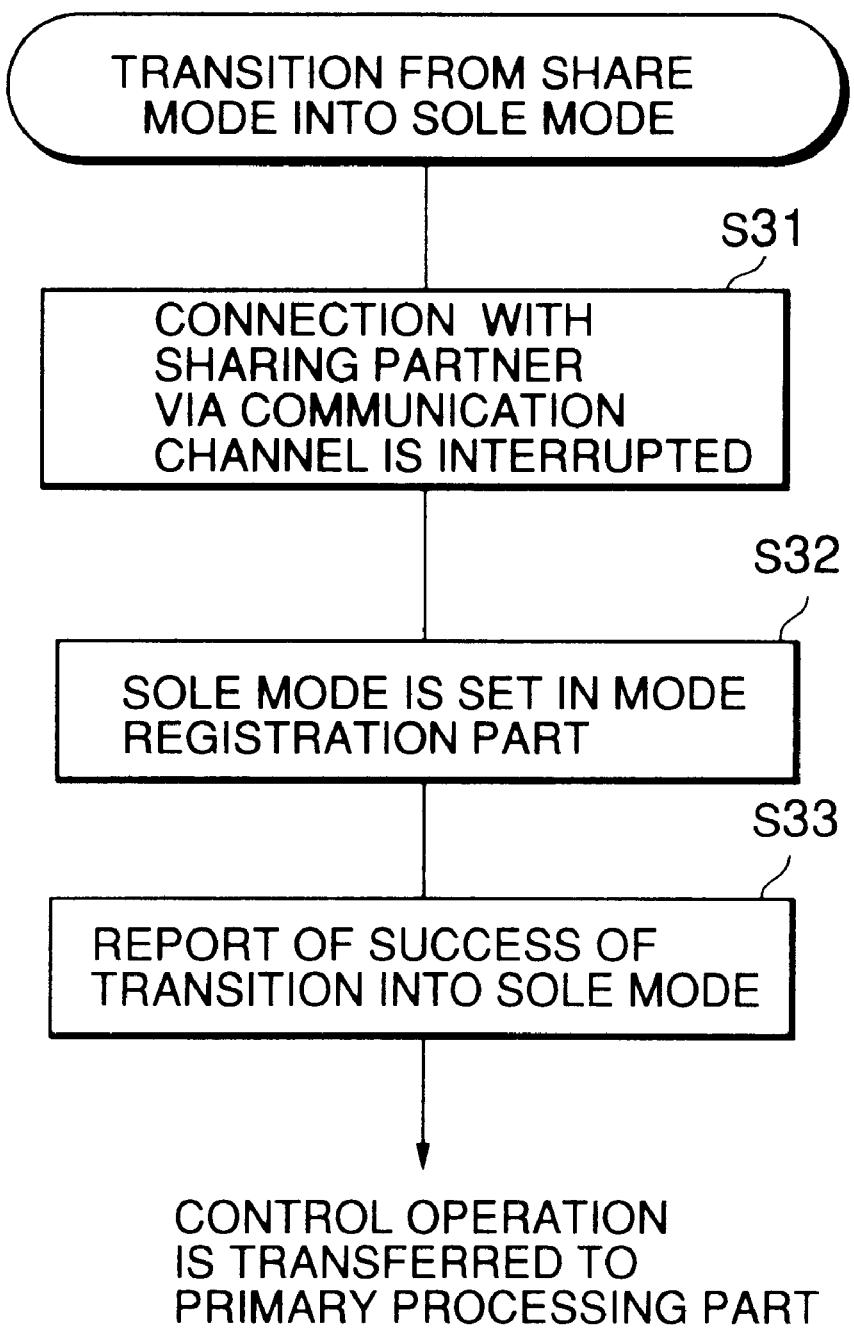
FIG. 5 is a flow chart for describing an operation of a sole-mode transition control part illustrated in FIG. 1.

Referring to FIG. 5, the operation of the sole-mode transition control part K will be described.

When the sole mode transition request for the application program AP is produced, the sole-mode transition control part K accepts the request only when the share mode is set in the mode registration part F. The sole-mode transition control part K interrupts the connection via the communication channel CH in the communication library D (step S31) and sets the sole mode in the mode registration part F instead of the share mode (step S32). Transition into the sole mode is reported as a response (step S33). Then, the control operation is transferred to the primary processing part A.

Figure 6:
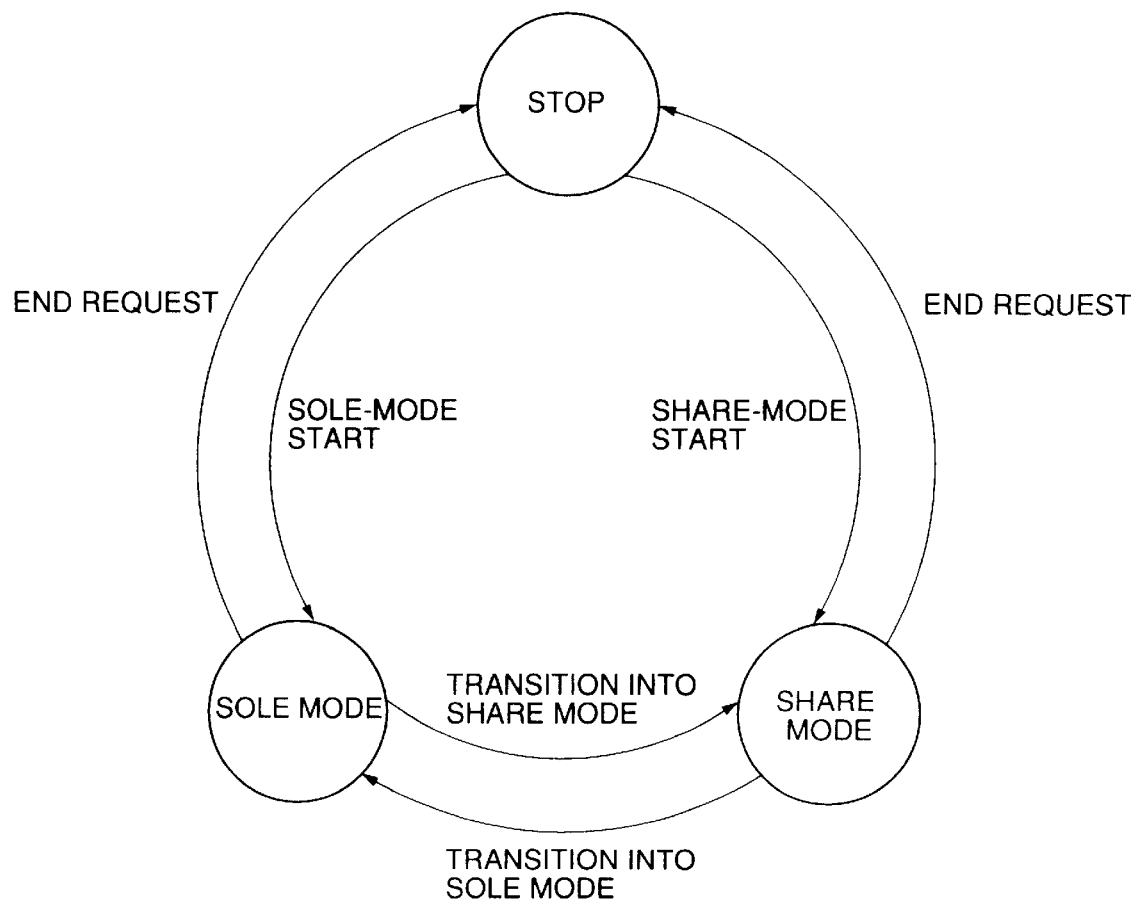
FIG. 6 is a transition diagram of an operating condition of the application program illustrated in FIG. 1.

Referring to FIG. 6, the operating condition of the application program AP will be described. A stop state proceeds to a sole-mode operation state and a share-mode operation state when the sole-mode and share-mode start requests are received, respectively. The sole-mode operation state proceeds to the stop state and the share-mode operation state when the end request and the share-mode transition request are received, respectively. The share-mode operation state proceeds to the stop state and the sole-mode operation state when the end request and the sole-mode transition request are received, respectively.

Figure 7:
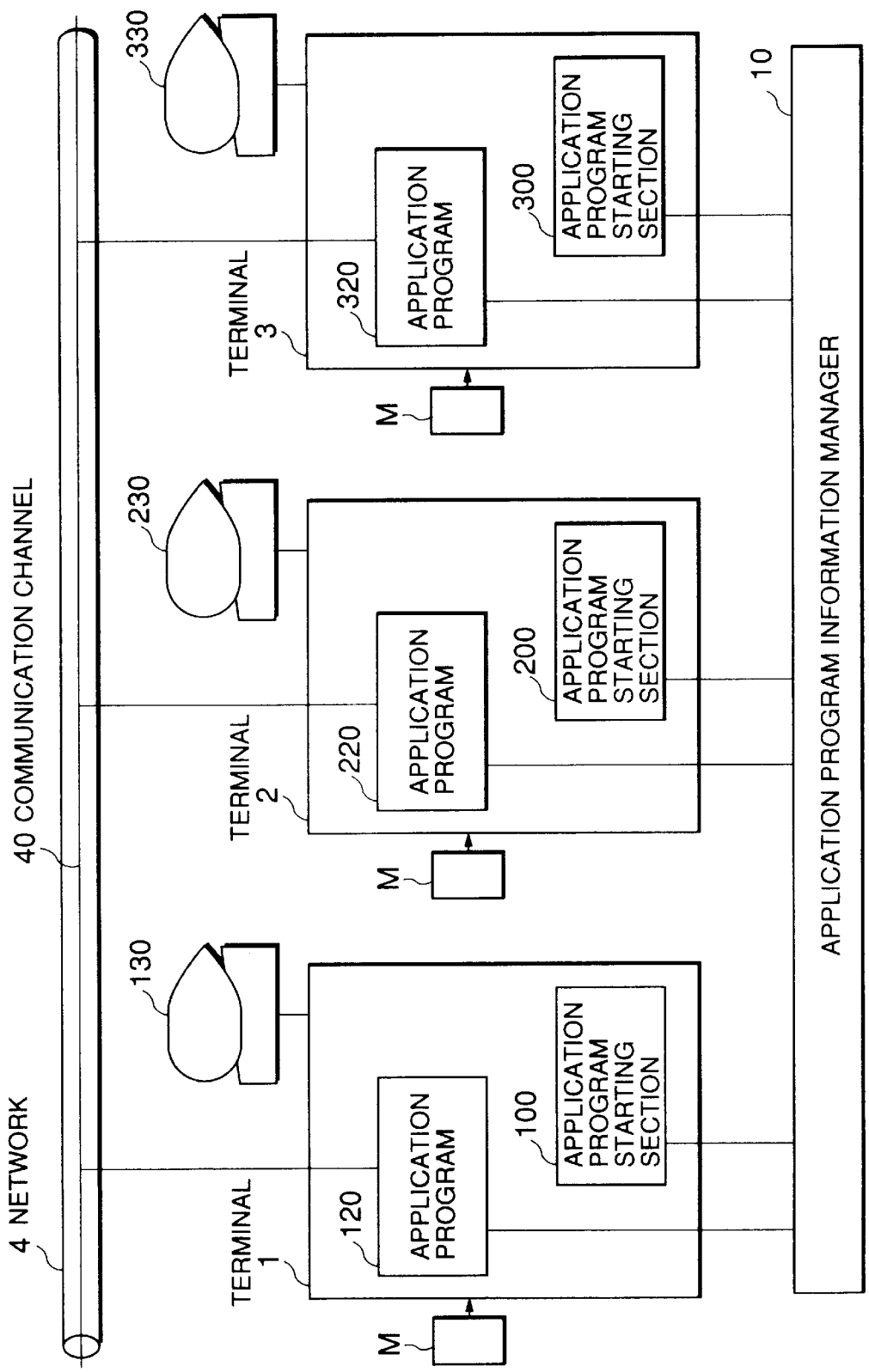
FIG. 7 is a block diagram of the application sharing system according to this invention.

Referring to FIG. 7, the application sharing system according to this invention includes a plurality of terminals 1, 2, and 3 interconnected via a network 4 to be communicable with one another. The terminals 1, 2, and 3 are provided with application programs 120, 220, and 320 of the same sort each of which has a structure as described in conjunction with FIG. 1. The terminals 1, 2, and 3 further have application program start sections 100, 200, and 300, respectively. In FIG. 7, each of the terminals 1, 2, and 3 has only one application program. However, a plurality of sorts of application programs are generally provided.

The terminals 1, 2, and 3 are connected to an application program information manager 10 and to user input/output units 130, 230, and 330, respectively. Each of the user input/output units 130, 230, and 330 includes an input device such as a keyboard and a mouse and an output device such as a CRT.

A recording medium M such as a magnetic disk and a semiconductor memory is connected to each of the terminals 1, 2, and 3. A program recorded in the recording medium M is read into a computer forming each of the terminals 1, 2, and 3 to control the operation of the computer. Thus, the computer acts as various parts (FIG. 1) of each of the application programs 120, 220, and 320 and as each of the application program start sections 100, 200, and 300.

The network 4 serves to establish the communication among the terminals by means of electric, electromagnetic, and physical arrangements and can be implemented in various forms such as the Ethernet, the ATM network, the FDDI, and the radio LAN. The network 4 has a plurality of communication channels 40 which can be logically distinguished from one another. Therefore, in addition to separation by time-division and frequency-division multiplexing systems, the communication channels may be distinguished by assigning each of the communication channels 40 with an identification number which is added to or included in transmission data.

The application programs 120, 220, and 320 connected via one of the communication channels 40 mutually exchange information to thereby match internal information held by the application programs 120, 220, and 320. As a consequence, the results of processing are coincident with one another. This makes it possible to achieve the application sharing by a plurality of terminal users.

The application program start sections 100, 200, and 300 are responsive to user's requests from the user input/output units 130, 230, and 330, respectively, or to a request from the application program information manager 10 and activates the application programs 120, 220, and 320, respectively.

The application program information manager 10 manages application program information for the application programs involved in the application sharing.

Figure 8:
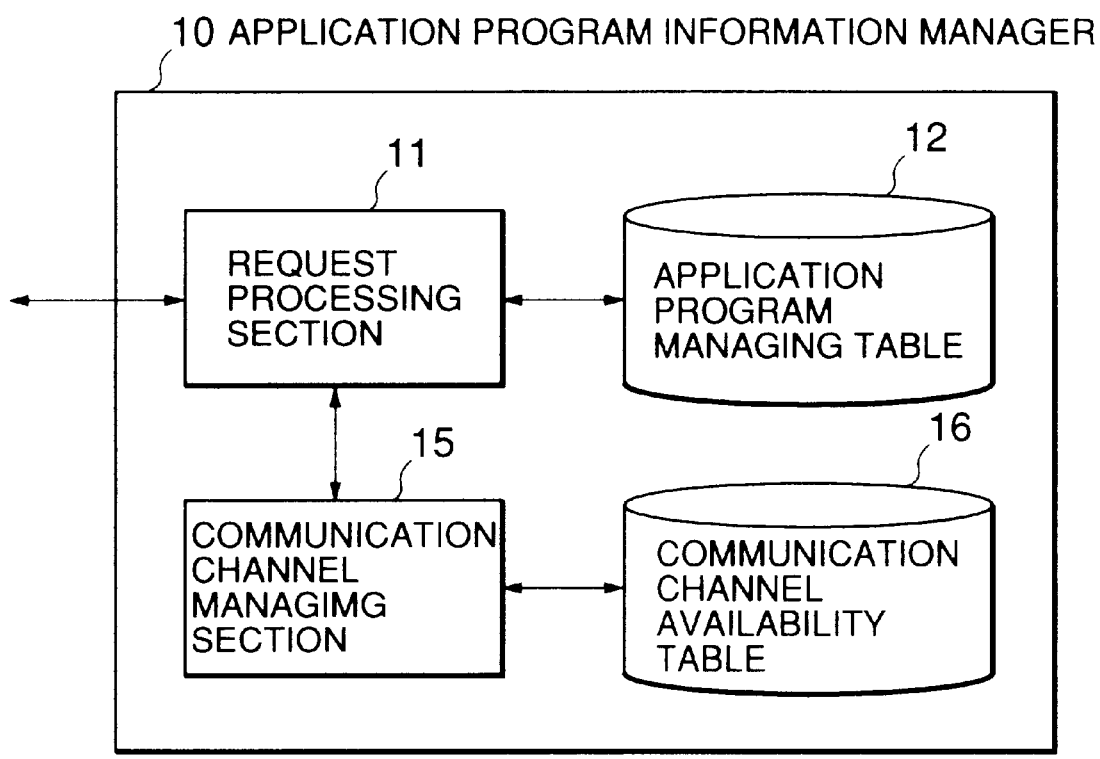
FIG. 8 is a block diagram of an application program information manager illustrated in FIG. 7.

Referring to FIG. 8, the application program information manager 10 comprises a request processing section 11, an application program managing table 12, a communication channel managing section 15, and a communication channel availability table 16.

In response to a request from each of the application programs 120, 220, and 320 and the application program starting sections 100, 200, and 300 as a requesting source, the request processing section 11 executes the processing corresponding to the request, reports the result of processing to the requesting source, and issues a new request to the remaining ones of the application program starting sections 100, 200, and 300.

The communication channel managing section 15 is responsive to a request from the request processing section 11 and assigns a new one of the communication channels 40 for the application programs 120, 220, and 320, and releases the communication channel.

The communication channel availability table 16 holds a list of states of use of individual communication channels 40 contained in the network 4.

Referring to FIG. 9, the application program managing table 12 holds various information related to the application sharing. As illustrated in the figure, the application program managing table 12 comprises a plurality of tags each of which corresponds to sharing of one application program. Each tag has three items of "Application Name", "Communication channel ID", and "Operating Terminal". The sort (name) of the application program being operated is set in the item of Application Name. The ID of the communication channel used in communication between the application programs is set in the item of Communication Channel ID. The name of the terminal where the application program is operated is set in the item of Operating Terminal. For example, the tag in a first row represents that the application program in the name of "Painting Tool" is operated on the terminals 1, 2, and 3 and that the communication channel having the ID of "1" is used for communication thereamong. In case where the application program of only one sort is operated in a single system, the item of Application Name can be omitted.

If a plurality of terminals connected to the network 4 are divided into groups and the application sharing is carried out group by group, the application program information manager 10 may be provided for each group to manage the application program information in the group.

Now, description will be made in detail as regards the operation of this embodiment for each of various situations.

(1) Share-Mode Start

A plurality of application programs of the same sort are simultaneously operated in the share mode.

Figure 10:
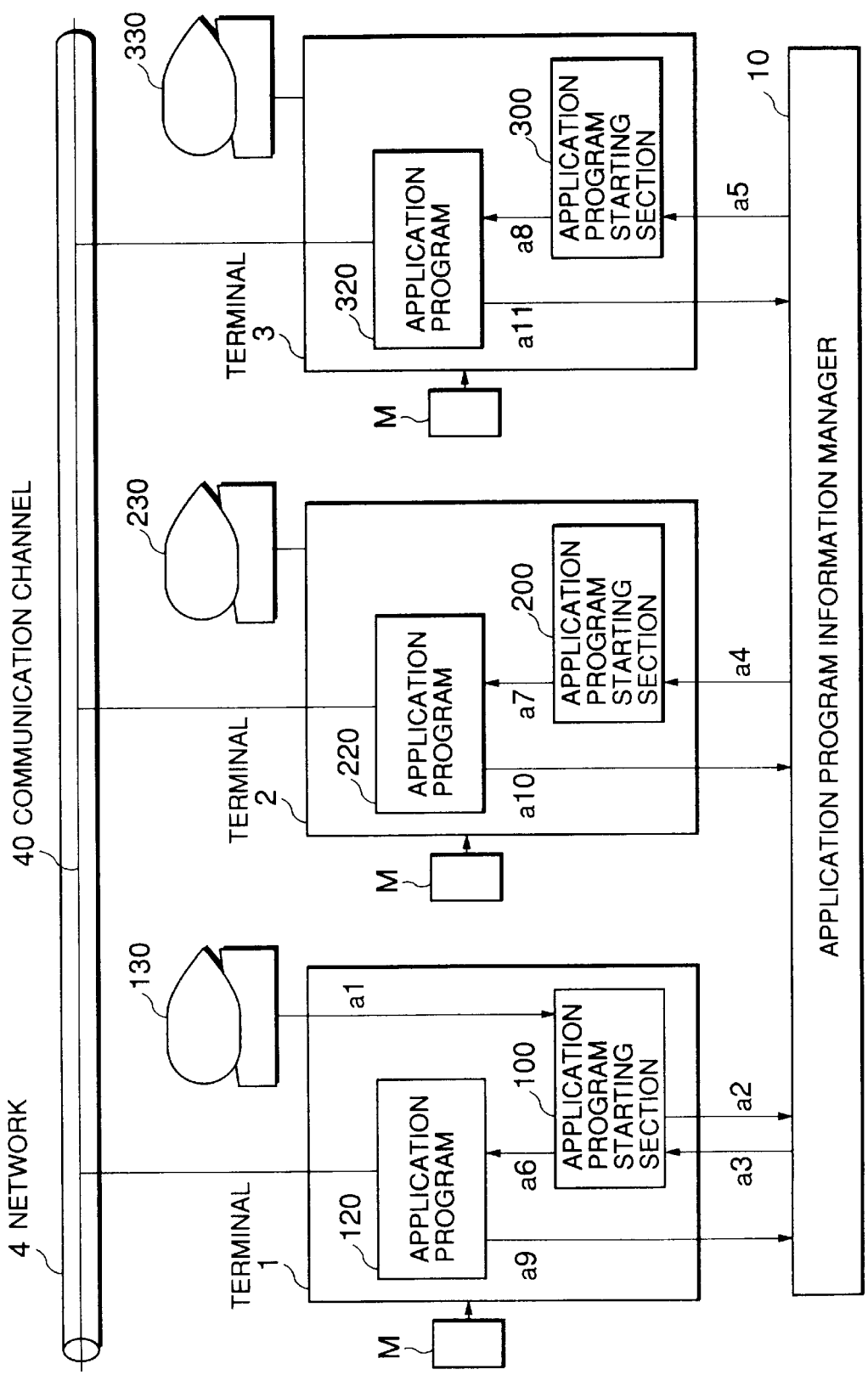
FIG. 10 is a view for describing an operation of simultaneously starting a plurality of application programs of the same sort in a share mode.

Referring to FIG. 10, the operation of simultaneously starting the application programs 120, 220, and 320 in the share mode will be described.

In order to simultaneously start the application programs 120, 220, and 320 in the share mode on the terminals 1, 2, and 3, the user enters the share-mode start request through one of the user input/output units 130, 230, and 330 to a corresponding one of the application program starting sections 100, 200, and 300. The share-mode start request includes the designation of the name of the application program to be started and the name of the terminals as partner terminals to be involved in the application sharing. In the following description, it is assumed that the share-mode start request a1 is supplied through the user input/output unit 130 of the terminal 1, as illustrated in FIG. 10.

Supplied with the share-mode start request a1, the application program starting section 100 transmits the share-mode start request a1 to the application program information manager 10 as depicted at a2 in the figure.

In FIG. 8, the share-mode start request a2 is received by the request processing section 11 of the application program information manager 10. The request processing section 11 requests the communication channel managing section 15 to assign a new communication channel. The communication channel managing section 15 refers to the communication channel availability table 16 and selects one of unassigned communication channels as a selected communication channel 40. Then, the communication channel managing section 15 rewrites the communication channel availability table 16 to change an unassigned or unoccupied state of the selected communication channel 40 into an occupied state and sends the ID of the selected communication channel 40 back to the request processing section 11. The request processing section 11 adds a new tag to the application program managing table 12 to record the name of the application program designated by the share-mode start request a1 and the ID of the selected communication channel 40 sent back as described above. For example, it is assumed that the name of the application program is a "Painting Tool" and that the ID of the communication channel is "1". In this event, "Painting Tool" and "1" are set in the item of Application Name and the item of Communication Channel ID, respectively, as depicted at the topmost tag in FIG. 9. Then, the request processing section 11 requests, with the designation of the ID of the selected communication channel 40, the application program starting section 100 as the requesting source to start the application program 120, as depicted at a3 in the figure. Furthermore, the request processing section 11 requests, with the designation of the ID of the selected communication channel 40, the application program starting sections 200 and 300 of the remaining terminals 2 and 3 involved in the share-mode start to start the application programs 220 and 320, as depicted at a4 and a5 in the figure, respectively.

In response, the application program starting sections 100, 200, and 300 start the application programs 120, 220, and 320 in the share mode with the designation of the ID of the communication channel 40, as depicted at a6, a7, and a8, respectively.

In FIG. 1, when the application programs 120, 220, and 320 are started by the application program starting sections 100, 200, and 300 in response to the share-mode start request with the designation of the ID of the communication channel, the start condition control part H in each of the application programs 120, 220, and 320 sets the share mode and the ID of the communication channel 40 in the mode registration part F. By the use of the communication library D, trial is made of establishing connection and communication with the others of the application programs 120, 220, and 320 as the partner application programs via the communication channel. When the communication is successful, the matching operation is carried out to match the internal states of the application program and the partner application programs. The success of the share-mode start with the ID of the communication channel is reported to the application program information manager 10 as depicted at a9, a10, and a11. The control operation is then transferred to the primary processing part A. Herein, the matching operation of the internal states are not substantially carried out because all of the application programs 120, 220, and 320 are simultaneously started from initial states.

In FIG. 8, the report of success of the share-mode start is received by the request processing section 11 of the application program information manager 10. The request processing section 11 searches the application program managing table 12 using as a search key the ID of the communication channel 40 used by the application programs 120, 220, and 320 to find a particular tag. The names of the terminals 1, 2, and 3 on which the application programs 120, 220, and 320 are operated are recorded in the particular tag at the tiem of Operating Terminals.

(2) Share-Mode Operation after Share-Mode Start

The application programs of the same sort are operated in the share mode. The operation will be described in conjunction with the case where the application programs 120, 220, and 320 are operated in the share mode.

It is assumed here that any user input addressed to the application program 120 is supplied through the user input/output unit 130 of the terminal 1. Referring to FIG. 1, the user input IN is received by the user input processing part B of the primary processing part A in the application program 120 and transmitted as the message to the message transfer part E. Since the operation mode set in the mode registration part F is the share mode, the message transfer part B delivers the message to the message processing part C in the application program 120 and to the communication channel 40, for example, in a broadcasting mode. The message processing part C processes the message supplied thereto.

On the other hand, the message transfer part E of each of the application programs 220 and 320 of the terminals 2 and 3 operated in the share mode receives the above-mentioned message delivered to the communication channel 40 in the broadcasting mode and transfers the message to the message processing part C of each of the application programs 220 and 320. The message processing part C performs the processing corresponding to the message.

In the above-mentioned manner, the processing corresponding to the user input supplied to the application program 120 is carried out not only in the application program 120 but also in the application programs 220 and 320. Therefore, all of the application programs 120, 220, and 320 produce identical processing results which are delivered to the user input/output units 130, 230, and 330 of the terminals 1, 2, and 3.

Likewise, when any user input addressed to the application program 220 or 320 is supplied through the user input/output unit 230 or 330 of the terminal 2 or 3, the message transfer is carried out so that the application programs 120, 220, and 320 perform the same processing.

Thus, the application sharing is achieved.

(3) Simultaneous End

Figure 11:
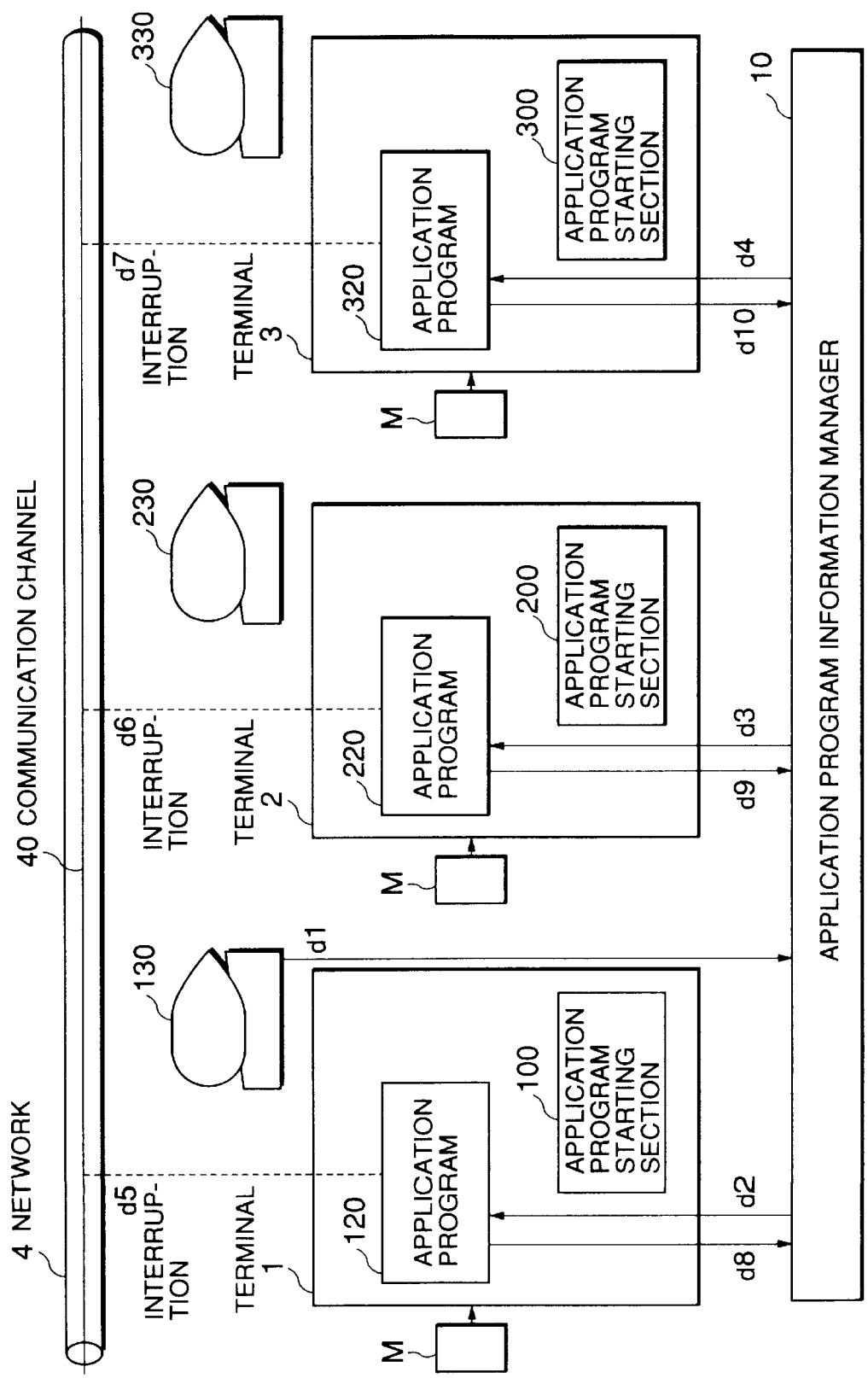
FIG. 11 is a view for describing an operation of simultaneously ending a plurality of application programs being operated in the share mode.

A plurality of application programs operating in the share mode are simultaneously finished. With reference to FIG. 11, the operation will be described in conjunction with the case where the application programs 120, 220, and 320 operating in the share mode are simultaneously finished.

In order to simultaneously finish the application programs 120, 220, and 320 operating in the share mode, the user supplies the end request through one of the user input/output units 130, 230, and 330 to the application program information manager 10. The end request includes the designation of the ID of the communication channel 40 used inn the share mode.

In the following description, it is assumed that the end request d1 is supplied through the user input/output unit 130 of the terminal 1, as illustrated in FIG. 11. The end request 31 may be given through the application program 120 or the application program starting section 100.

In FIG. 8, the end request d1 is received by the request processing section 11 of the application program information manager 10. The request processing section 11 searches the application program managing table 12 using as a search key the ID of the communication channel 40 designated by the end request d1 to find a particular tag. The end request is delivered to the application programs 120, 220, and 330 of the terminals 1, 2, and 3 specified in the items of Application Name and Operating Terminal and in the particular tag, as depicted by d2, d3, and d4.

In FIG. 1, when each of the application programs 120, 220, and 320 receives the end request, the end condition control part I refers to the mode registration part F to identify that the operation mode is the share mode and makes the communication library D interrupt the connection via the communication channel. The end of the share mode is reported to the application program information manager 10 as depicted at d8, d9, and d10. Thus, each of the application programs is finished.

In FIG. 8, when the end report is received by the application program information manager 10, the request processing section 11 deletes, from the item of Operating Terminal of the particular tag already searched, the name of the terminal where each of the application programs delivering the end report is operated. When all of the application programs 120, 220, and 320 deliver the end reports, the names of all terminals are deleted so that the item of Operating Terminal in the tag is vacant. The request processing section 11 then informs the communication channel managing section 15 of the ID of the communication Channel 40 specified in the item of Communication Channel ID to request the release of the communication channel 40. In addition, the tag in consideration is deleted. The communication channel managing section 15 renews the communication channel availability table 16 to change the communication channel 40 from the occupied state to the unoccupied state.

(4) Individual End

Figure 12:
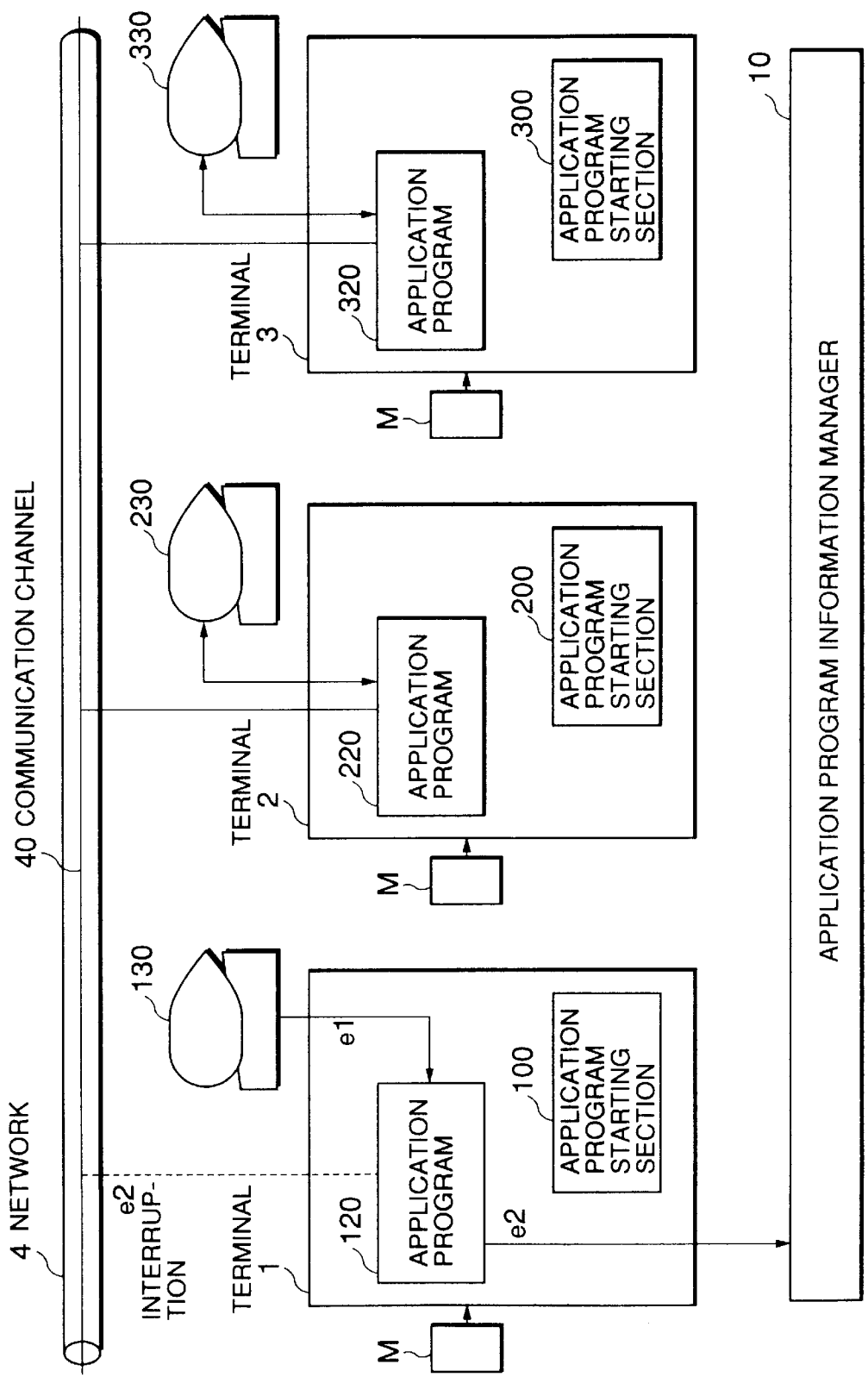
FIG. 12 is a view for describing an operation of individually ending a plurality of application programs being operated in the share mode.

A plurality of application programs operating in the share mode are individually finished. With reference to FIG. 12, the operation will be described in conjunction with the case where the application program 120 is finished while the application programs 120, 220, and 320 are operated in the share mode.

In order to finish the application porgram 120 while the application programs 120, 220, and 320 are operated on the terminals 1, 2, and 3 in the share mode, the end request e1 addressed to the application program 120 is supplied through the user input/output unit 130 of the terminal 1, as illustrated in FIG. 12. It may be the case that, when the user of the terminal 1 delivers a quitting request through the user input/output unit 130 to the application program information manager 10, the end request e1 is supplied from the application program information manager 10 to all application programs on the terminal 1.

In FIG. 1, when the end request is received by the application program 120, the end condition control part I refers to the mode registration part F to identify that the operation mode is the share mode, makes the communication library D interrupt the connection via the communication channel, and reports the end of the share mode to the application program information manager 10 as depicted at e2. Thus, the application program is finished.

In FIG. 8, the end report is received by the request processing section 11 of the application program information manager 10. The request processing section 11 searches the application program managing table 12 using as a search key the name of the application program delivering the end report to find a particular tag. The name of the terminal 1 specified in the particular tag at the tiem of Operating Terminal is deleted.

When the other application programs 22 and 320 deliver the end reports, the names of all terminals are deleted so that the item of Operating Terminal in the tag becomes vacant. The request processing section 11 then informs the communication channel managing section 15 of the ID of the communication channel 40 specified in the item of Communication Channel ID to request the release of the communication channel 40. In addition, the tag in consideration is deleted. The communication channel managing section 15 renews the communication channel availability table 16 to change the communication channel 40 from the occupied state to the unoccupied state.

(5) Transition from Share Mode into Sole Mode

Figure 13:
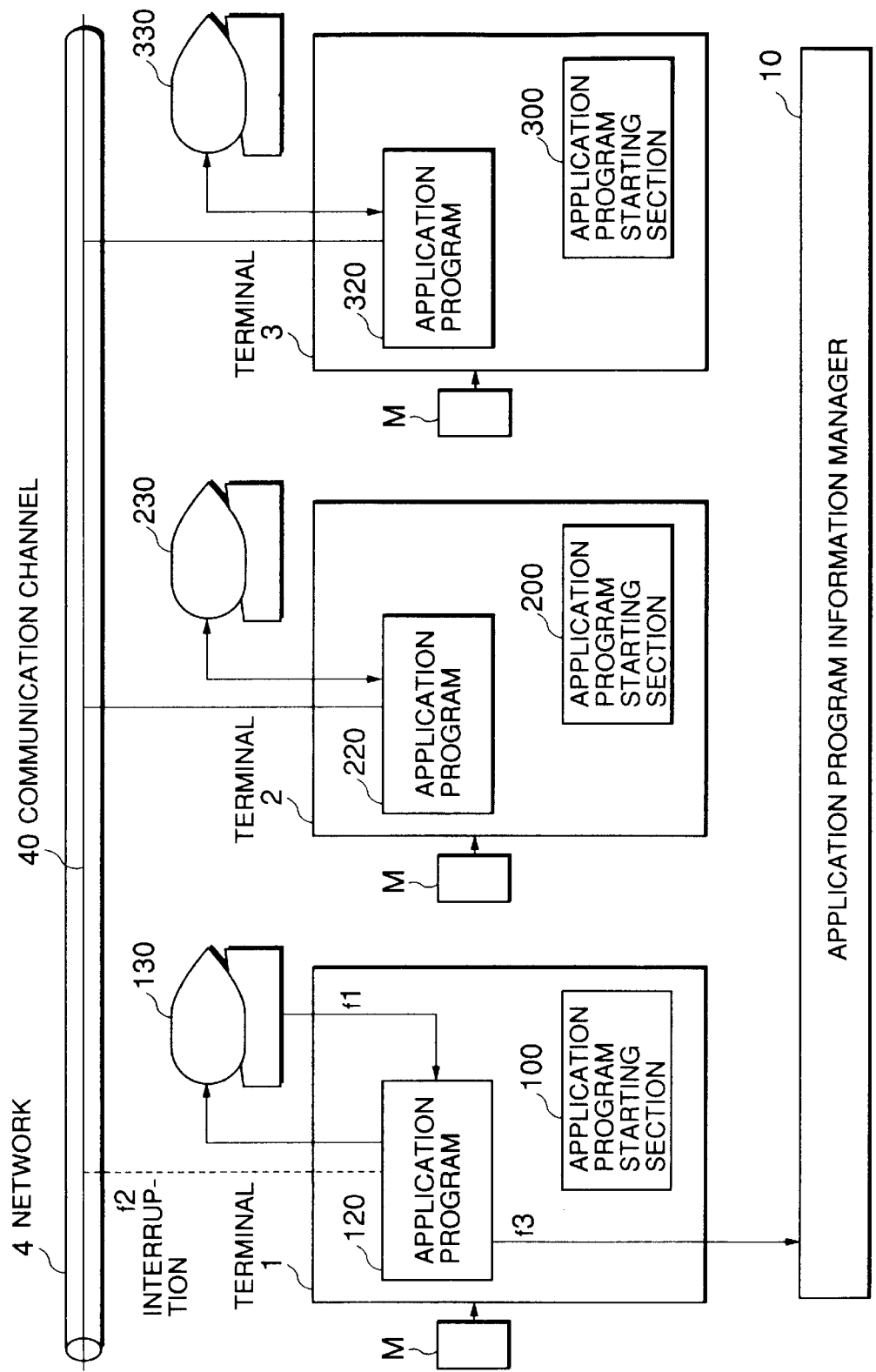
FIG. 13 is a view for describing an operation of shifting one of a plurality of application programs being operated in the share mode into a sole mode.

One of a plurality of application program soperating in the share mode is shifted into a sole mode. With reference to FIG. 13, the operation will be described in conjunction with the case where the application program 120 is shifted into the sole mode while the application programs 120, 220, and 320 are operated in the share mode by the use of the communication channel 40.

In order to shift the application program 120 being operated in the share mode into the sole mode, the user supplies a sole-mode transition request f1 to the application program 120 through the user input/output unit 130 as shown in FIG. 13.

In FIG. 1, when the application program 120 receives the sole-mode transition request, the sole-mode transition control part K makes the communication library D interrupt the connection via the communication channel 40 as depicted at f2 in FIG. 13. The sole-mode transition control part K sets the sole mode in the mode registration part F instead of the share mode, and reports the success of transition to the sole mode to the application program information manager 10, as depicted at f3 in the figure. Then, the control operation is transfered to the primary processing part A. Upon transition into the sole mode, the internal state of the application program is held as it is.

In FIG. 8, the above-mentioned sole-mode transition report is received by the request processing section 11 of the application program information manager 10. The request processing section 11 searches the application program managing table 12 using as a search key the name of the application program 120 producing the transition report to find a particular tag. The name of the terminal 1 where the application program 120 has been operated is deleted from the item of Operating Terminal in the particular tag.

When the remaining application programs 220 and 320 are shifted into the sole mode and the sole-mode transition reports are delivered, the request processing section 11 deletes the names of these terminals from the item of Operating Terminal in the tag. When the item of Operating Terminal becomes vacant, the ID of the communication channel 40 specified in the item of Communication Channel ID is informed to the communication channel managing section 15 to request the release thereof. In addition, the tag in consideration is deleted. The communication channel managing section 15 renews the communication channel availability table 16 to change the communication channel 40 from the occupied state into the unoccupied state.

(6) Operation in Sole Mode

An application program is operated in the sole mode. The operation will be described in conjunction with the application program 120.

It is assumed that any user input is given through the user input/output unit 130 of the terminal 1 to the application program 120. Referring to FIG. 1, the user input IN is received by the user input processing part B of the primary processing part A in the application program 120 and transmitted as the message to the message transfer part E. Since the operation mode set in the mode registration part F is the sole mode, the message transfer part E transfers the message to the message processing part C in the application program 120 alone. The message processing part C processes the message supplied thereto. In the above-mentioned manner, the processing corresponding to the user input supplied to the application program 120 is executed in the application program 120 alone. Thus, the operation in the sole mode is achieved.

(7) Transition from Sole Mode into Share Mode

Figure 14:
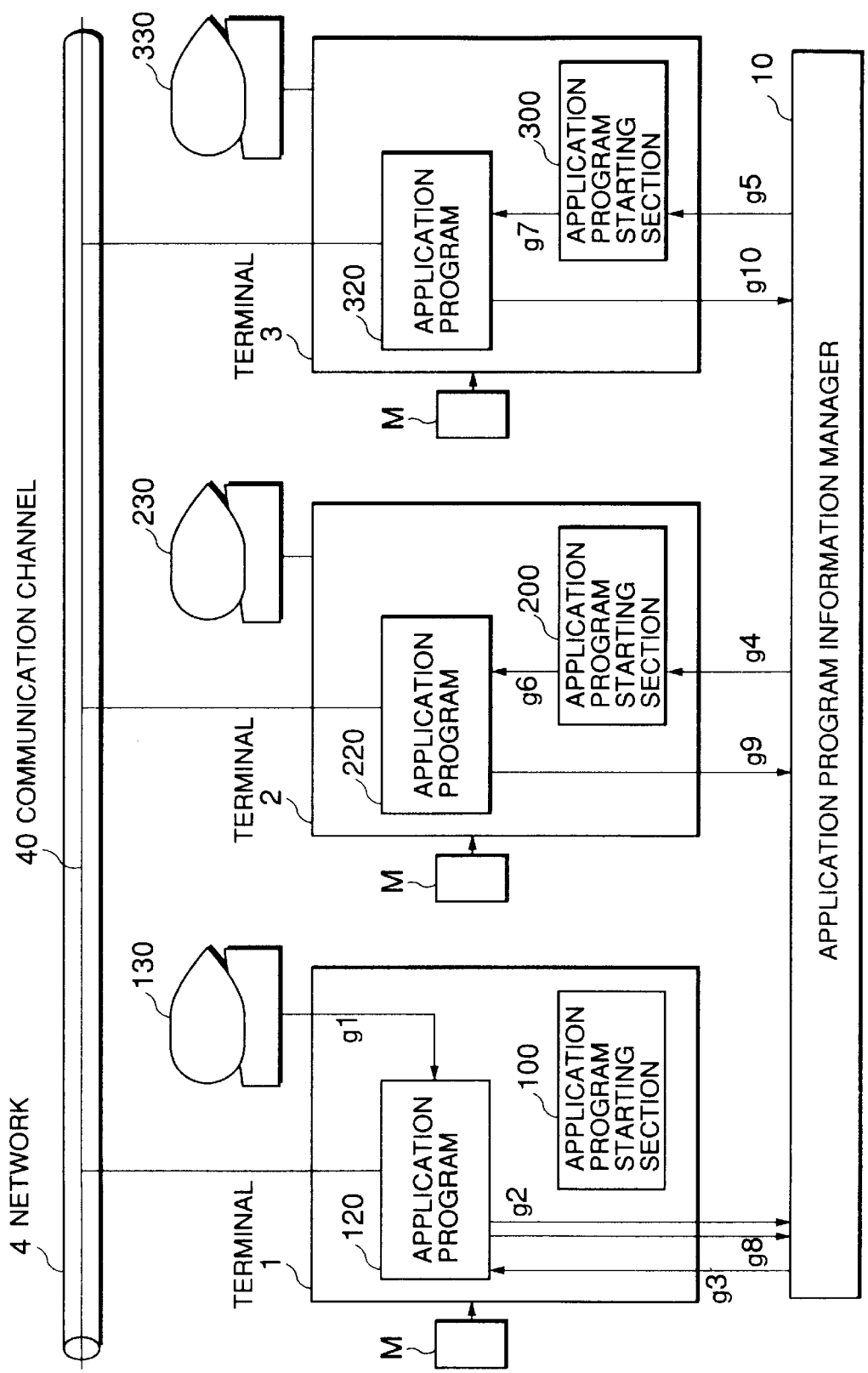
FIG. 14 is a view for describing an operation of shifting an application program being operated in the sole mode into the share mode.

An application program operating in the sole mode is shifted into the share mode. Referring to FIG. 14, the operation will be described in conjunction with the case where the application program 120 being operated on the terminal 1 in the sole mode and the application programs 220 and 320 started in the share mode on the terminals 2 and 3 are collectively operated in the share mode.

In order to make the other terminals 2 and 3 participate in the application program operating in the sole mode on the terminal 1, a share-mode transition request g1 with the designation of the name of the terminals 2 and 3 to participate is supplied to the application program 120 through the user input/output unit 130 of the terminal 1, as illustrated in FIG. 14.

The application program 120 transmits to the application program information manager 10 the share-mode transition request g1 with the name of the application program added thereto, as depicted at g2 in the figure.

In FIG. 8, the share-mode transition request g2 is received by the request processing section 11 of the application program information manager 10. The request processing section 11 requests the communication channel managing section 15 to assign the new communication channel. The communication channel managing section 15 refers to the communication channel availability table 16 holding the list of availability of the communication channels and selects one of the unassigned communication channels as the selected communication channel 40, rewrites the communication channel availability table 16 to change the communication channel 40 into the occupied channel, and sends the ID of the selected communication channel 40 back to the request processing section 11. The request processing section 11 adds the new tag to the application program managing table 12 to record the name of the application program and the ID of the communication channel 40 sent back as described above. The request processing section 11 requests, with the designation of the ID of the communication channel 40, the application program 120 as the requesting source to proceed to the share mode, as depicted at g3 in the figure. Simultaneously, the request processing section 11 requests, with the designation of the ID of the same communication channel 40, the application program starting sections 200 and 300 of the other terminals 2 and 3 to start the application programs 220 and 320 as partner application programs in the share mode, as depicted at g4 and g5 in the figure, respectively.

In FIG. 1, when the application program 120 receives the share-mode transition request, the share-mode transition control part J sets the share mode in the mode registration part F instead of the sole mode, together with the ID of the communication channel 40 designated by the request. In addition, trial is made of establishing connection and communication with the partner application programs 220 and 320 via the communication channel by the use of the communication library D. When the communication is successful, the matching operation is carried out to match the internal states of the application program and the partner application programs. In this case, since the application programs 220 and 320 as the partner application programs are started at that time instant, the share-mode transition control part J carries out the matching operation to match the internal states of the application programs 220 and 320 to that of the application program 120. The success of the transition into the share mode is reported to the application program information manager 10 as depicted at g8 in FIG. 14. The control operation is then transferred to the primary processing part A.

On the other hand, each of the application program starting sections 200 and 300 is responsive to the share-mode start request and delivers, with the designation of the communication channel 40, the share-mode start request to each of the application programs 220 and 320, as depicted at g5 and g7 in FIG. 14.

In FIG. 1, when each of the application programs 220 and 320 receives the share-mode start request with the designation of the ID of the communication channel 40, the start condition control part H sets the share mode and the ID of the communication channel 40 in the mode registration part F, and tries to establish connection and communication via the communication channel with the partner application programs by the use of the communication library D. If the communication is successful, the matching operation is carried out to match the internal states of the application program and the partner application programs. In this case, since the application programs 220 and 320 have just been started, their internal states are matched to the internal state of the application program 120 already operated. The success of the share-mode start is reported to the application program information manager 10 as depicted at g9 and g10 in FIG. 14. Then, the control operation is transferred to the primary processing part A.

In FIG. 8, the reports of success of the share-mode transition and the share-mode start delivered from the application programs 120, 220, and 320 are received by the request processing section 11 of the application program information manager 10. The request processing section 11 searches the application program managing table 12 using as a search key the ID of the communication channel 40 used by the application programs 120, 220, and 320 to find a particular tag. The names of the terminals 1, 2, and 3 where the application programs 120, 220, and 320 are operated are recorded in the particular tag at the item of Operating Terminal.

(8) Share State Monitoring Operation

The application program managing table 12 in the application program information manager 10 manages which terminal uses which communication channel and shares which application program. Therefore, the user can monitor the share state by looking the content of the application program managing table 12. The monitoring operation will hereafter be described in conjunction with the case where the user of the terminal 1 monitors the share state at the user input/output unit 130.

In order to monitor the share state, the user of the terminal 1 supplies a share-state monitor request to the application program information manager 10 through the user input/output unit 130. Referring to FIG. 8, the share-state monitor request is received by the request processing section 11 of the application program information manager 10. The request processing section 11 delivers the content of the application program managing table 12 to the user input/output unit 130 as a requesting source. The user input/output unit 130 displays the content of the application program managing table 12 for presentation to the user.

In the example described above, the user input/output unit 130 and the application program information manager 10 directly exchange the information. However, the application program starting section 100 may be interposed therebetween.

(9) Participation of New Terminal into Share State

Figure 15:
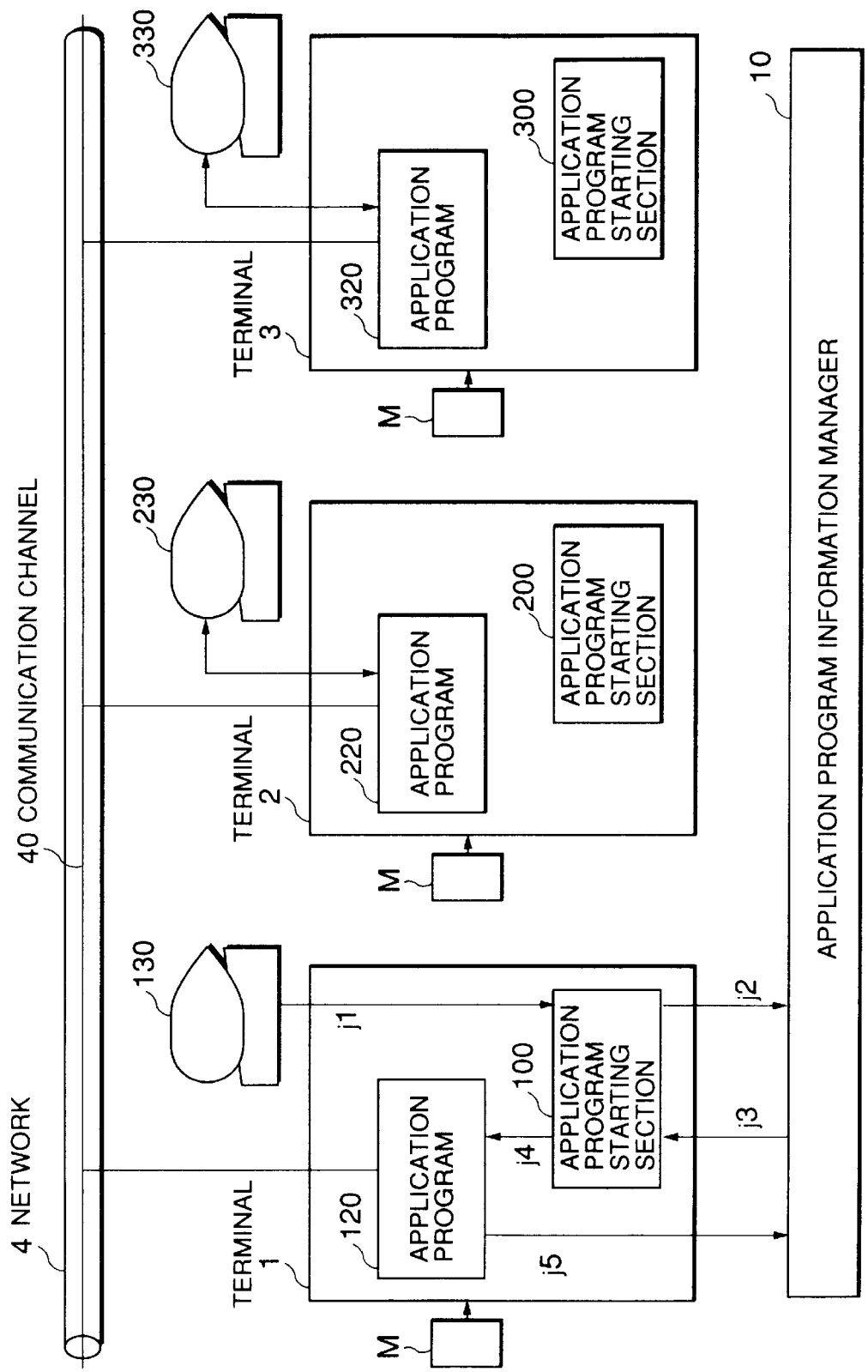
FIG. 15 is a view for describing an operation of making another terminal participate in a joint work with the application programs of the same sort already operated in the share mode.

While application programs of the same sort are operated on a plurality of terminals in the share mode, another terminal is made to participate. Referring to FIG. 15. the operation will be described in conjunction with the case where the terminal 1 newly participates while the application programs 220 and 320 are operated in the share mode on the terminals 2 and 3.

It is assumed that the user of the terminal 1 knows through the share state monitoring operation in (8) that the application sharing is being performed by the application programs 220 and 320 on the terminals 2 and 3, and desires to participate. In this event, as illustrated in FIG. 15, a share-mode start request j1 with the designation of the ID of the communication channel 40 used by the application programs 220 and 320 on the terminals 2 and 3 is supplied through the user input/output unit 130 to the application program starting section 100.

Supplied with the share-mode start request j1, the application program starting section 100 delivers to the application program information manager 10 a query request for the names of the application program and the terminal using the communication channel 40 corresponding to the ID contained in the request, as depicted at j2 in FIG. 15.

In FIG. 8, the query request j2 is received by the request processing section 11 of the application program information manager 10. The request processing section 11 searches the application program managing table 12 using as a search key the ID of the communication channel 40 to find the application name and the terminal name which are sent back to the application program starting section 100 as depicted at j3 in FIG. 15.

The application program starting section 100 starts, with the designation of the ID of the communication channel 40, the application program 120 corresponding to the application name in the share mode, as depicted at j4 in FIG. 15.

In FIG. 1, when the application program 120 is started in response to the share-mode start request with the designation of the ID of the communication channel 40, the start condition control part H sets the share mode and the ID of the communication channel 40 in the mode registration part F. By the use of the communication library D, trial is made of establishing connection and communication with the partner application programs via the communication channel 40. When the communication is successful, the matching operation is carried out to match the internal states of the application program and the partner application programs. On the other hand, the share-mode transition control part J of each of the application programs 220 and 320 as the partner application programs is responsive to the communication from the application program 120 as a new participant via the communication channel 40 and carries out the matching operation of matching the internal states of the application program and the partner application programs. In this case since the application program 120 has just been started, the matching operation is carried out to match the internal state of the application program 120 to those of the application programs 220 and 320. Thereafter, the start condition control part H of the application program 120 delivers a report of success of the share-mode start to the application program information manager 10. Then, the control operation is transferred to the primary processing part A.

In FIG. 8, when the report of success of the share-mode start is received from the application program 120, the request processing section 11 of the application program information manager 10 searches the application program managing table 12 using as a search key the ID of the communication channel 40 used by the application program 120 to find a particular tag. The name of the terminal 1 where the application program 120 is operated is recorded in the particular tag at the item of Operating Terminal.

(10) Integration of Share Mode Operation State and Sole Mode Operation State

Figure 16:
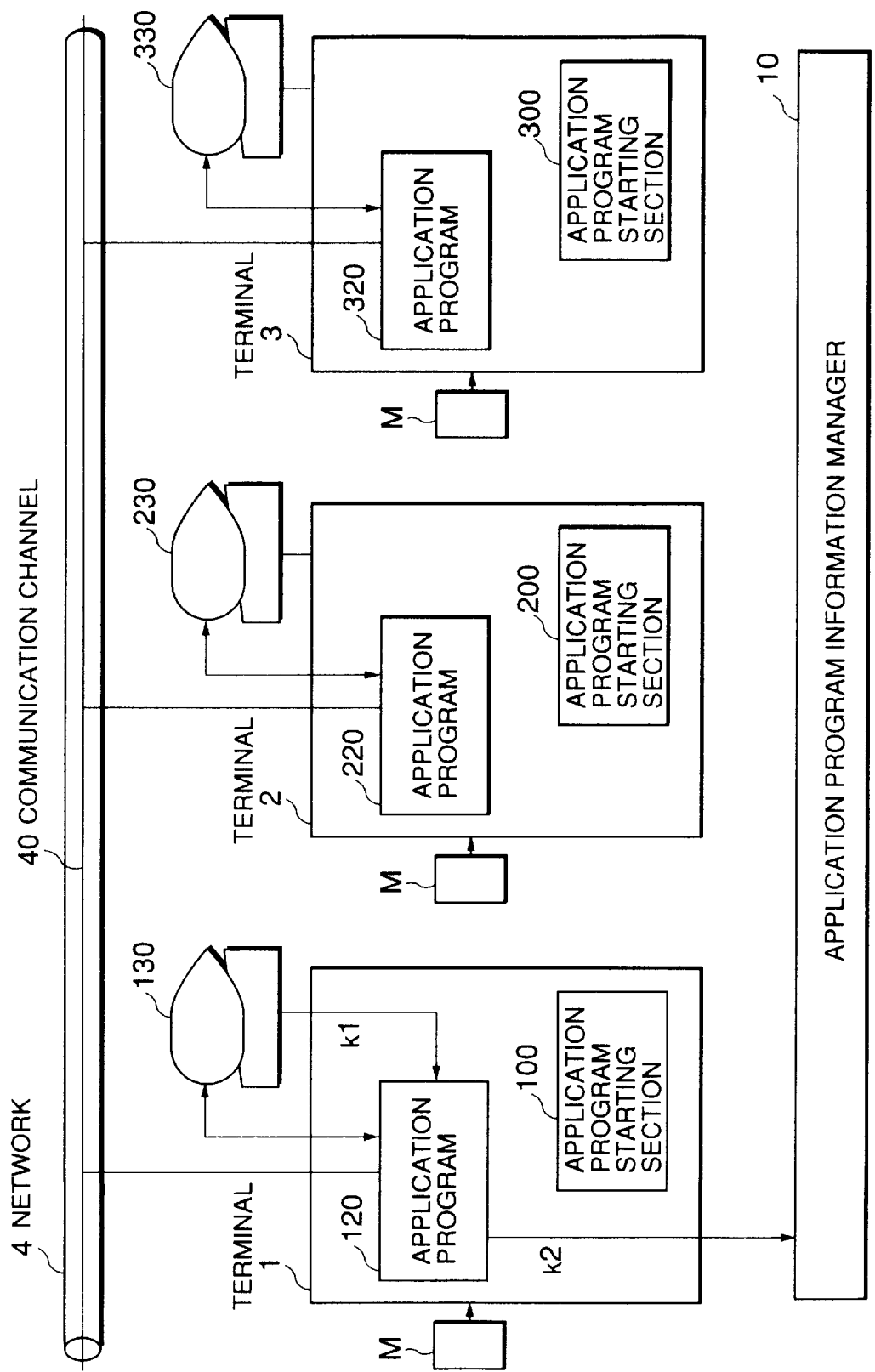
FIG. 16 is a view for describing an operation in which a plurality of application programs being operated in the share mode and another application program of the same sort being operated in the sole mode are collectively operated in the share mode.

Application programs of the same sort are operated in the share mode on a plurality of terminals while an application program of the same sort is operated in the sole mode on another terminal. Then, those terminals are collectively operated in the share mode. Referring to FIG. 16, the operation will be described in conjunction with the case where the application programs 220 and 320 operated in the share mode on the terminals 2 and 3 and the application program 120 operated in the sole mode on the terminal 1 are collectively operated in the share mode.

It is assumed that the user of the terminal 1 knows through the share state monitoring operation in (8) that the application sharing is being performed by the application programs 220 and 320 on the terminals 2 and 3, and desires to participate. In this event, as illustrated in FIG. 16, a share-mode transition request k1 with the designation of the ID of the communication channel 40 used by the application programs 220 and 320 on the terminals 2 and 3 is supplied to the application program 120 being operated in the sole mode.

In FIG. 1, when the application program 120 receives the share-mode transition request, the share-mode transition control part J sets the share mode in the mode registration part F instead of the sole mode, together with the ID of the communication channel 40 designated by the request. By the use of the communication library D, trial is made of establishing connection and communication with the partner application programs via the communication channel. When the communication is successful, the matching operation is carried out to match the internal states of the application program and the partner application programs. On the other hand, the share-mode transition control part J of each of the application programs 220 and 320 as the partner application programs is responsive to the communication from the application program 120 as a new participant via the communication channel 40 and carries out the matching operation to match the internal states of the application program and the partner application programs. Thereafter, the share-mode transition control part J of the application program 120 supplies the application program information manager 10 with a report of transition into the share mode together with the ID of the communication channel 40, as depicted at k2 in FIG. 16. Then, the control operation is transferred to the primary processing part A.

In FIG. 8, when the report of transition into the share mode is supplied from the application program 120, the request processing section 11 of the application program information manager 10 searches the application program managing table 12 using as a search key the ID of the communication channel 40 used by the application program 120 to find a particular tag. The name of the terminal 1 where the application program 120 is operated is recorded in the particular tag at the item of Operating Terminal.

It is assumed here that incoincidence is present between the information held by the application program 120 and the information held by the application programs 220 and 320 when they are connected. In this event, the information held by the all application programs may be matched to the information held by the application program 120 or the information held by the application programs 220 and 320. Which information is to be a goal of matching can be contained in the share-mode transition request. Alternatively, prior to the information matching operation, each of the application programs 120, 220, and 320 can ask each of the user input/output units 130, 230, and 330 to determine which information is to be a goal of matching, respectively. Alternatively, the matching operation may be made in accordance with any other predetermined rule.

In the foregoing, several modes of operation according to the embodiment of this invention have been described. However, this embodiment is not restricted to the above-mentioned modes of operation but can be modified in various other manners. Some modifications will be described hereinunder.

(1') Share-Mode Start

Figure 17:
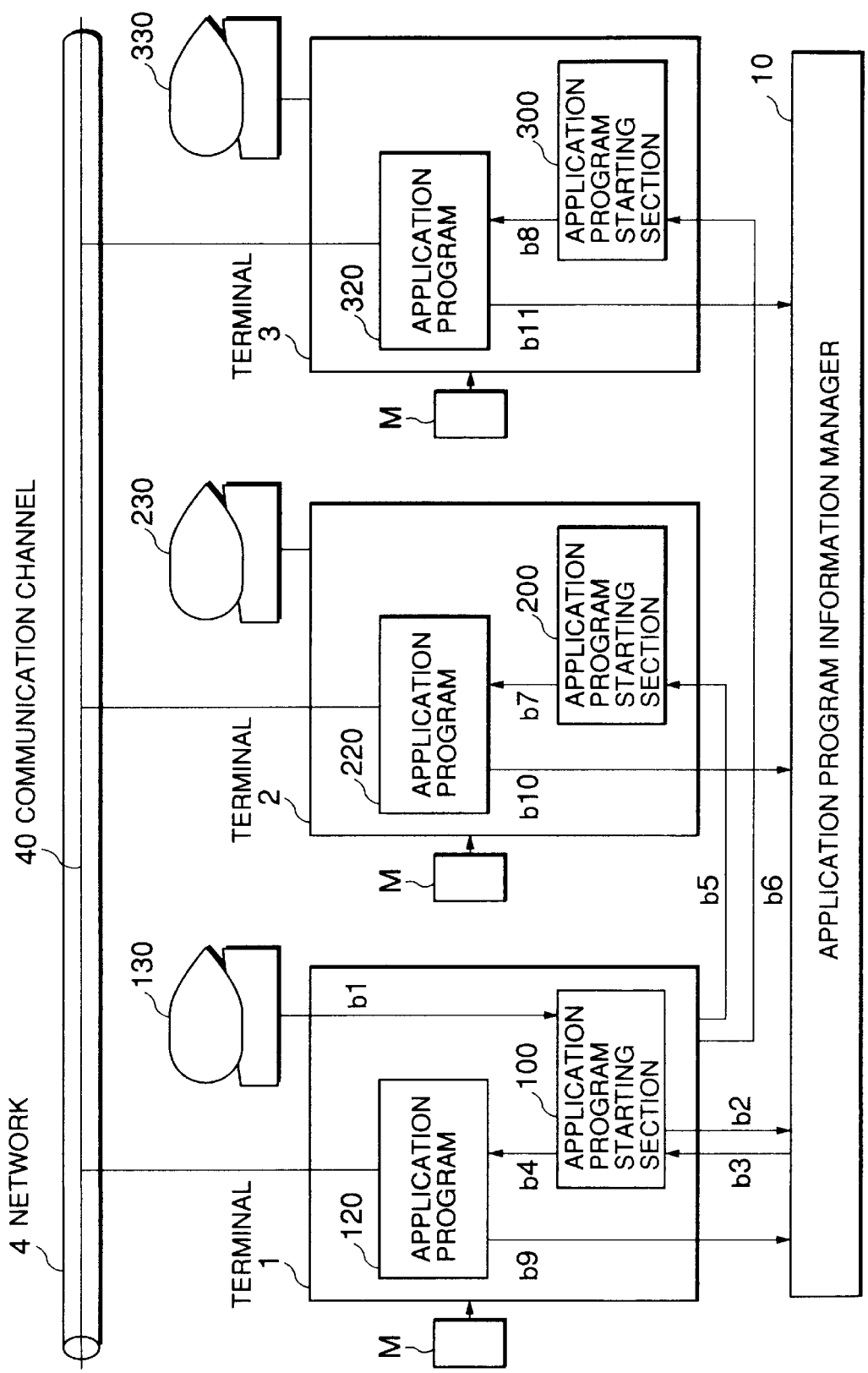
FIG. 17 is a view for describing another operation of simultaneously starting the application programs of the same sort in the share mode.

In the above-mentioned (1), the start request to the application program starting section of the other terminal as the partner terminal except the terminal to which the share-mode start request is supplied is delivered from the application program information manager 10. In this example on the other hand, the application program starting section of the terminal to which the share-mode start request is supplied delivers the start request to the other application program starting section of the other terminal. Referring to FIG. 17, description will be made about the case where the application programs 120, 220, and 320 are simultaneously started in the share mode, like in the above-mentioned (1).

In order to simultaneously start the application programs 120, 220, and 320 in the share mode on the terminals 1, 2, and 3, the user enters the share-mode start request through one of the user input/output units 130, 230, and 330 to a corresponding one of the application program starting sections 100, 200, and 300. The share-mode start request includes the designation of the application program to be started and the name of the terminals as the partner terminal. In the following, it is assumed that a share-mode start request b1 is entered through the user input/output unit 130 of the terminal 1 as illustrated in FIG. 17.

When the share-mode start request b1 is supplied, the application program starting section 100 delivers the share-mode start request b1 to the application program information manager 10 as depicted at b2 in FIG. 17.

In FIG. 8, the share-mode start request b2 is received by the request processing section 11 of the application program information manager 10. The request processing section 11 requests the communication channel managing section 15 to assign a new communication channel. The communication channel managing section 15 refers to the communication channel availability table 16 holding the list of the availability of the communication channels and selects one of the unassigned communication channels as a selected communication channel 40. Then, the communication channel availability table 16 is rewritten to change the assigned or unoccupied state of the communication channel 40 into the occupied state and the ID of the selected communication channel 40 is sent back to the request processing section 11. The request processing section 11 adds a new tag to the application program managing table 12 to record the name of the application program involved in the share-mode start and the ID of the communication channel 40 sent back as described above. The request processing section 11 notifies the ID of the communication channel 40 to the application program starting section 100 as a requesting source, as depicted at b3 in the figure.

Supplied with the notification of the ID of the communication channel 40, the application program starting section 100 starts the application program 120 in the share mode designating the ID of the communication channel 40, as depicted at b4 in the figure. Simultaneously, the application program starting section 100 requests the application program starting sections 200 and 300 of the other terminals 2 and 3 involved in the share-mode start to start the application programs 220 and 320 designating the ID of the same communication channel 40, as depicted at b5 and b6 in the figure. At this time, a communication path between the application program starting section 100 and each of the application program starting sections 200 and 300 may be the network 4 or any other route. In response, the application program starting sections 200 and 300 start the application programs 220 and 320 in the share mode, respectively, designating the ID of the communication channel 40, as depicted at b7 and b8 in the figure.

Subsequent steps are similar to those in the above-mentioned (1).

(7') Transition from Sole Mode into Share Mode

Figure 18:
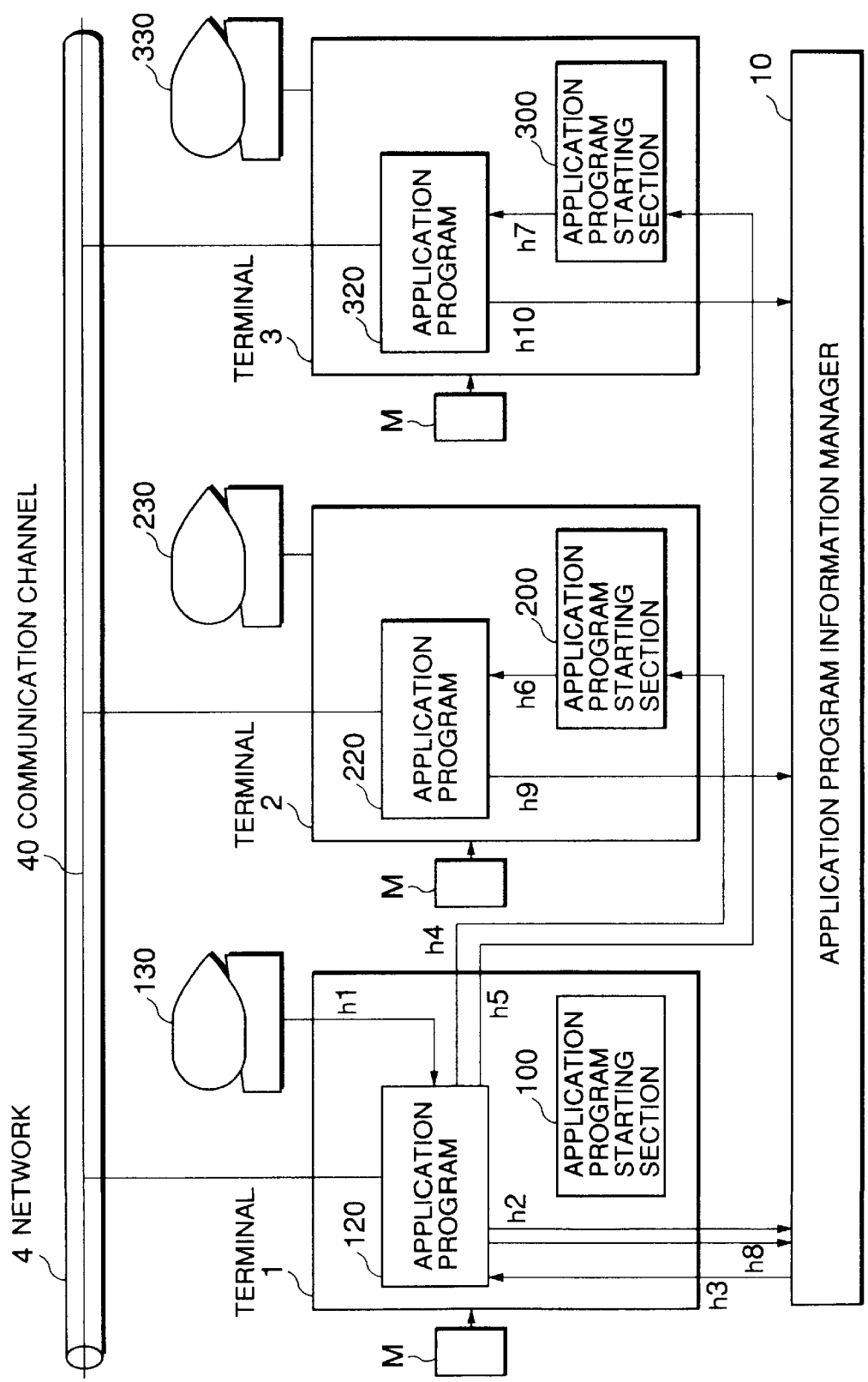
FIG. 18 is a view for describing another operation of shifting the application program being operated in the sole mode into the share mode.

In the above-mentioned (7), the start request to the application program starting section of the terminal newly participating in the share mode is delivered from the application program information manager 10. On the other hand, in this example, the start request to the other application program starting section is delivered from the application program shifted into the share mode. This function may be carried by the share-mode transition control part J. Referring to FIG. 18, the operation will be described in conjunction with the case where the application programs 220 and 230 being stopped on the terminals 2 and 3 participate with the application program 120 being operated in the sole mode on the terminal 1 so as to achieve the application sharing among the application programs 120, 220, and 320, like in the above-mentioned (7).

In order to make the terminals 2 and 3 participate with the application program 120 being operated in the sole mode on the terminal 1, a share-mode transition request h1 with the designation of the terminal names of the terminals 2 and 3 to participate is entered through the user input/output unit 130 of the terminal 1 to the application program 120, as illustrated in FIG. 18. The share-mode transition control part J of the application program 120 transmits the request h1 to the application program information manager 10 as depicted at h2 in the figure.

In FIG. 8, the request h2 is received by the request processing section 11 of the application program information manager 10. The request processing section 11 requests the communication channel managing section 15 to assign a new communication channel. The communication channel managing section 15 refers to the communication channel availability table 16 holding the list of availability of the communication channels and selects one of the unassigned communication channels as the selected communication channel 40. Then the communication channel availability table 16 is rewritten to change the unassigned or unoccupied state of the selected communication channel 40 into the occupied state and the ID of the selected communication channel 40 is sent back to the request processing section 11. The request processing section 11 adds a new tag to the application program managing table 12 to record the name of the application program and the ID of the communication channel 40 sent back as described above. Then, the request processing section 11 requests the application program 120 as a requesting source to proceed to the share mode, designating the ID of the communication channel 40, as depicted at h3 in the figure.

The share mode transition control part J of the application program 120 requests the application program starting sections 200 and 300 of the terminals 2 and 3 to start the application programs 220 and 320, respectively, designating the communication channel 40 informed as described above, as depicted at h4 and h5 in the figure. The communication path between the application program 120 and each of the application program starting sections 200 and 300 may be the network 4 or any other route. Then, the transition into the share mode is performed.

In FIG. 1, the share mode transition control part J of the application program 120 sets the share mode in the mode registration part F instead of the sole mode. In addition, the ID of the communication channel 40 designated by the request h3 is set in the mode registration part F. By the use of the communication library D, trial is made of establishing connection and communication via the communication channel with the partner application programs. When the communication is successful, the matching operation is carried out to match the internal states of the application program and the partner application programs. In this case, since the application programs 220 and 320 as the partner application programs have just been started at that time instant, the share-mode transition control part J carries out the matching operation to match the internal states of the application programs 220 and 320 to that of the application program 120. The success of transition into the share mode is reported to the application program information manager 10 as depicted at h8 in the figure. Then, the control operation is transferred to the primary processing part A.

On the other hand, each of the application program starting sections 200 and 300 is responsive to the share-mode start request and starts each of the application programs 220 and 320 in the share mode, designating the communication channel 40, as depicted at h6 and h7 in FIG. 18.

In FIG. 1 in addition, upon occurrence of the share-mode start request with the designation of the ID of the communication channel 40, the start control part H of each of the application programs 220 and 320 sets the share mode and the ID of the communication channel 40 in the mode registration part F. By the use of the communication library D, trial is made of establishing connection and communication via the communication channel with the partner application programs. When the communication is successful, the matching operation is carried out to match the internal states of the application program and the partner application programs. In this case, since the application programs 220 and 320 have just been started, their internal states are matched to that of the application program 120 already operated. The success of the share-mode start is reported to the application program information manager 10 as depicted at h9 and h10 in FIG. 18. Then, the control operation is transferred to the primary processing part A.

In FIG. 8, the reports of the success of transition into the share mode and the success of the share-mode start delivered from the application programs 120, 220, and 320 are received by the request processing section 11 of the application program information manager 10. The request processing section 11 searches the application program managing table 12 using as a search key the ID of the communication channel 40 used by the application programs 120, 220, and 320 to find a particular tag. The name of the terminals 1, 2, and 3 where the application programs 120, 220, and 320 are operated are recorded in the particular tag at the item of Operating Terminal.

(10') Integration of Share Mode Operation State and Sole Mode Operation State

Figure 19:
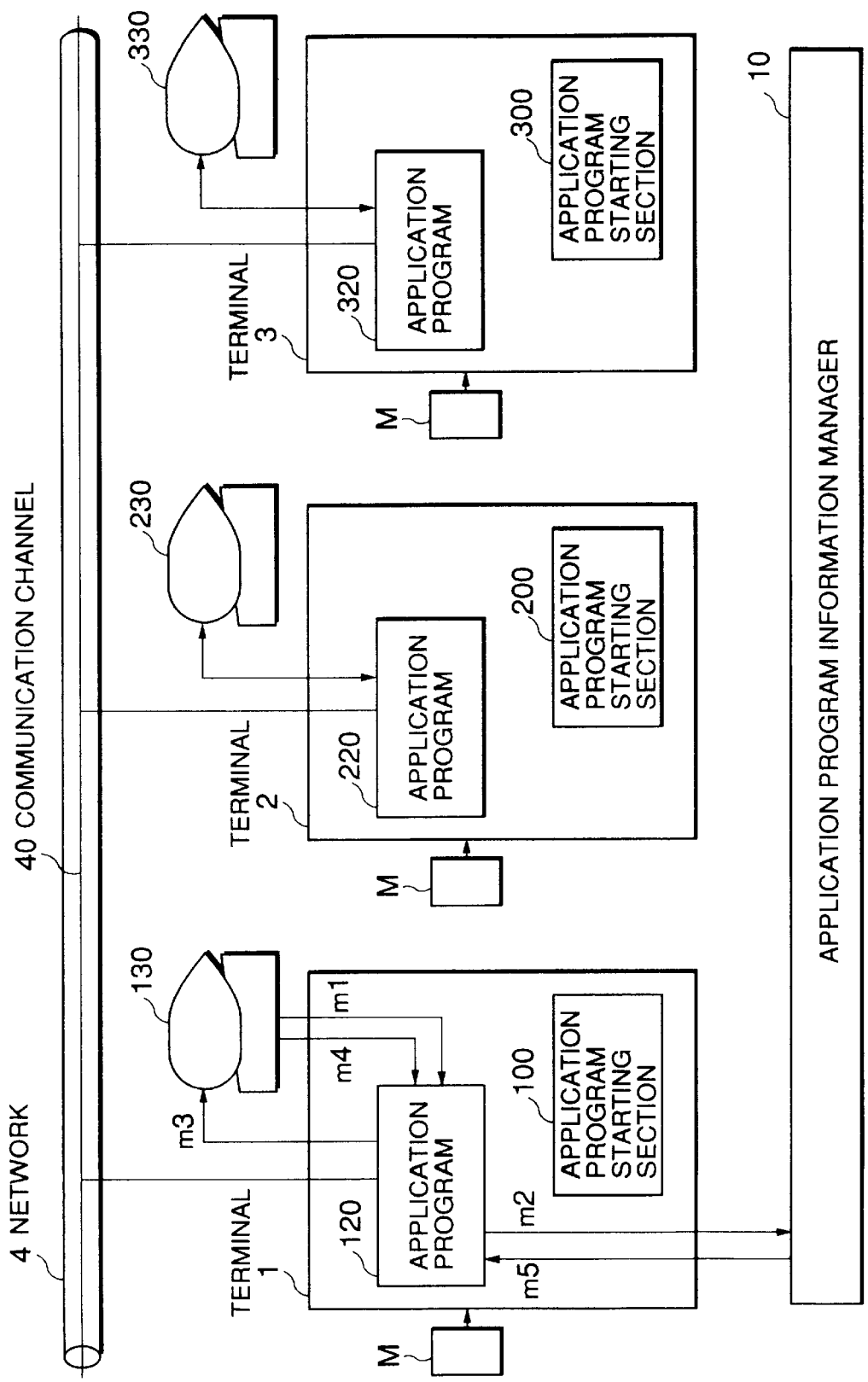
FIG. 19 is a view for describing another operation in which the a plurality of application programs being operated in the share mode and another application program of the same sort being operated in the sole mode are collectively operated in the share mode.

In the above-mentioned (10), in order to shift the application program operated in the sole mode into the share mode to participate in the joint work with the plurality of the application programs operated in the share mode, the ID of the communication channel used by the application programs operating in the share mode must be independently examined, for example, by the share state monitoring operation described in (8). In this embodiment, the share state monitoring operation can be carried out through the application program operating in the sole mode and transition to the share mode can be performed when the user desires. Referring to FIG. 19, description will be made about the case where the application program 120 operating in the sole mode on the terminal 1 participate in the joint work with the application programs 220 and 320 operating in the share mode on the terminals 2 and 3, like in the above-mentioned (10).

When the user of the terminal 1 where the application program 120 is operated in the sole mode desires to monitor the share state, a share state monitor request m1 is entered through the user input/output unit 130 to the application program 120, as illustrated in FIG. 19. The application program 120 delivers the share state monitor request m1 to the application program information manager 10 as depicted at m2 in the figure.

In FIG. 8, the share state monitor request is received by the request processing section 11 of the application program information manager 10. The request processing section 11 delivers the content of the application program managing table 12 to the application program 120 as the requesting source. The application program 120 makes the user input/output unit 130 display the content of the application program managing table 120 for presentation to the user, as depicted at m3 in the figure.

When the user of the terminal 1 knows via the share state monitoring operation that the application sharing is performed by the application programs 220 and 320 on the terminals 2 and 3 and desires to participate, he sends a notice to the application program 120 as depicted at m4 in the figure.

The application program 120 judges that the notice is a share-mode transition request and carries out transition into the share mode by the use of the ID of the communication channel 40 used by the application programs 220 and 320 of the terminals 2 and 3.

In FIG. 1, the share-mode transition control part J of the application program 120 sets the share mode in the mode registration part F instead of the sole mode, together with the ID of the communication channel 40. By the use of the communication library D, trial is made of establishing connection and communication via the communication channel with the partner application programs. When the communication is successful, the matching operation is carried out to match the internal states of the application program and the partner application programs. The share-mode transition control part J of each of the application programs 220 and 320 as the partner application programs carries out the matching operation of matching the internal states of the application program and the partner application programs when communication is received from the application program 120 as a new participant via the communication channel 40. Thereafter, the share-mode transition control part J of the application program 120 reports the transition into the share mode to the application program information manager 10 as depicted at m5 in the figure. Then, the control operation is transferred to the primary processing part A.

In FIG. 8, when the report of transition into the share mode is supplied from the application program 120, the request processing section 11 of the application program information manager 10 searches the application program managing table 12 using as a search key the ID of the communication channel 40 used by the application program 120 to find a particular tag. The name of the terminal 1 where the application program 120 is operated is recorded in the particular tag at the item of Operating Terminal.

As described above, according to this invention, it is possible to dynamically change the operating condition of the application program from the sole mode to the share mode and vice versa. Therefore, transition from the sole work to the joint work and vice versa is possible. Thus, it is possible to flexibly deal with the change in working environment where the application program is used.

What is claimed is:

1. An application sharing system in which a plurality of terminals having application programs of the same sort are interconnected via a network having a plurality of communication channels so that said terminals are communicable with each other, wherein the application program of each of said terminals comprises:

a primary processing part comprising a user input processing part for producing, in response to a user input supplied to the application program of said each of said terminals, a user message representative of a content of said user input and a message processing part for carrying out, in response to an incoming message, an operation based on said incoming message;

a mode registration part for holding whether an operation mode of the application program of said each of said terminals is a sole mode or a share mode and for holding, when said operation mode of the application program of said each of said terminals is said share mode, channel information specifying one of said communication channels as a specified channel;

message transfer means for carrying out, when said sole mode is set in said mode registration part, a transferring operation of transferring said user message to said message processing part as said incoming message, said message transfer means carrying out, when said share mode is set in said mode registration part, the transferring operation of transferring said user message to said message processing part as said incoming message, another transferring operation of transferring said user message to the application program of a sharing partner of said terminals by the use of said specified channel, and still another transferring operation of transferring to said message processing part as said incoming message another user message transferred from the application program of said sharing partner by the use of said specified channel; and start condition control means supplied with a share-mode start request with said channel information for setting said share mode and said channel information in said mode registration part and for making said message transfer part communicate with the application program of said sharing partner by the use of said specified channel to perform a matching operation of matching internal states of the primary processing parts of the application programs of said each of said terminals and of said sharing partner.

2. An application sharing system as claimed in claim 1, further comprising:

an application program information managing section connected to the application programs of said terminals for managing a state of use of each of said communication channels in the application programs of said terminals and for producing said channel information in response to said share-mode start request to deliver said share-mode start request having said channel information to the application program of said each of said terminals.

3. An application sharing system as claimed in claim 1, wherein said start condition control means performs the matching operation of matching the internal state of the primary processing part of the application program of said each of said terminals with the internal state of the primary processing part of the application program of said sharing partner when the application program of said partner operates in said sole mode.

4. An application sharing system in which a plurality of terminals having application programs of the same sort are interconnected via a network having a plurality of communication channels so that said terminals are communicable with each other, wherein the application program of each of said terminals comprises:

a primary processing part comprising a user input processing part for producing, in response to a user input supplied to the application program of said each of said terminals, a user message representative of a content of said user input and a message processing part for carrying out, in response to an incoming message, an operation based on said incoming message;

a mode registration part for holding whether an operation mode of the application program of said each of said terminals is a sole mode or a share mode and for holding, when said operation mode of the application program of said each of said terminals is said share mode, channel information specifying one of said communication channels as a specified channel;

message transfer means for carrying out, when said sole mode is set in said mode registration part, a transferring operation of transferring said user message to said message processing part as said incoming message, said message transfer means carrying out, when said share mode is set in said mode registration part, the transferring operation of transferring said user message to said message processing part as said incoming message, another transferring operation of transferring said user message to the application program of a sharing partner of said terminals by the use of said specified channel, and still another transferring operation of transferring to said message processing part as said incoming message another user message transferred from the application program of said sharing partner by the use of said specified channel; and share-mode transition control means supplied with a share-mode transition request with said channel information with said sole mode set in said mode registration part for setting, instead of said sole mode, said share mode and said channel information in said mode registration part and for making said message transfer part communicate with the application program of said sharing partner by the use of said specified channel to perform a matching operation of matching internal states of the primary processing parts of the application programs of said each of said terminals and of said sharing partner.

5. An application sharing system as claimed in claim 4, further comprising:

an application program information managing section connected to the application programs of said terminals for managing a state of use of each of said communication channels in the application programs of said terminals and for producing said channel information in response to said share-mode start request to deliver said share-mode start request having said channel information to the application program of said each of said terminals and to the application program of said sharing partner when the application program of said partner operates in said sole mode.

6. An application sharing system as claimed in claim 5, wherein said share-mode transition control means performs the matching operation of matching the internal state of the primary processing part of one of the application programs of said each of said terminals and of said sharing partner with the internal state of the primary processing part of another of the application programs of said each of said terminals and of said sharing partner.

7. An application sharing system in which a plurality of terminals having application programs of the same sort are interconnected via a network having a plurality of communication channels so that said terminals are communicable with each other, wherein the application program of each of said terminals comprises:

a primary processing part comprising a user input processing part for producing, in response to a user input supplied to the application program of said each of said terminals, a user message representative of a content of said user input and a message processing part for carrying out, in response to an incoming message, an operation based on said incoming message;

a mode registration part for holding whether an operation mode of the application program of said each of said terminals is a sole mode or a share mode and for holding, when said operation mode of the application program of said each of said terminals is said share mode, channel information specifying one of said communication channels as a specified channel;

message transfer means for carrying out, when said sole mode is set in said mode registration part, a transferring operation of transferring said user message to said message processing part as said incoming message, said message transfer means carrying out, when said share mode is set in said mode registration part, the transferring operation of transferring said user message to said message processing part as said incoming message, another transferring operation of transferring said user message to the application program of a sharing partner of said terminals by the use of said specified channel, and still another transferring operation of transferring to said message processing part as said incoming message another user message transferred from the application program of said sharing partner by the use of said specified channel; and sole-mode transition control means supplied with a sole-mode transition request with said share mode set in said mode registration part for setting, instead of said share mode and said channel information, said sole mode in said mode registration part and for making said message transfer part inhibit communication by the use of said specified channel.

8. A machine-readable recording medium for recording an application program to be executed for application sharing in an application sharing system in which a plurality of terminals are interconnected via a network having a plurality of communication channels so that said terminals are communicable with each other, wherein said application program serves to make each of said terminals act as:

a primary processing part comprising a user input processing part for producing, in response to a user input supplied to the application program of said each of said terminals, a user message representative of a content of said user input and a message processing part for carrying out, in response to an incoming message, an operation based on said incoming message;

a mode registration part for holding whether an operation mode of the application program of said each of said terminals is a sole mode or a share mode and for holding, when said operation mode of the application program of said each of said terminals is said share mode, channel information specifying one of said communication channels as a specified channel;

message transfer means for carrying out, when said sole mode is set in said mode registration part, a transferring operation of transferring said user message to said message processing part as said incoming message, said message transfer means carrying out, when said share mode is set in said mode registration part, the transferring operation of transferring said user message to said message processing part as said incoming message, another transferring operation of transferring said user message to the application program of a sharing partner of said terminals by the use of said specified channel, and still another transferring operation of transferring to said message processing part as said incoming message another user message transferred from the application program of said sharing partner by the use of said specified channel; and start condition control means supplied with a share-mode start request with said channel information for setting said share mode and said channel information in said mode registration part and for making said message transfer part communicate with the application program of said sharing partner by the use of said specified channel to perform a matching operation of matching internal states of the primary processing parts of the application programs of said each of said terminals and of said sharing partner.

9. A machine-readable recording medium as claimed in claim 8, wherein said application program serves to make each of said terminals further act as:

share-mode transition control means supplied with a share-mode transition request with said channel information with said sole mode set in said mode registration part for setting, instead of said sole mode, said share mode and said channel information in said mode registration part and for making said message transfer part communicate with the application program of said sharing partner by the use of said specified channel to perform a matching operation of matching internal states of the primary processing parts of the application programs of said each of said terminals and of said sharing partner.

10. A machine-readable recording medium as claimed in claim 9, wherein said application program serves to make each of said terminals further act as:

sole-mode transition control means supplied with a sole-mode transition request with said share mode set in said mode registration part for setting, instead of said share mode and said channel information, said sole mode in said mode registration part and for making said message transfer part inhibit communication by the use of said specified channel.

\* \* \* \* \*